US012457391B2

(12) United States Patent
Price

(10) Patent No.: US 12,457,391 B2
(45) Date of Patent: Oct. 28, 2025

(54) APPARATUS AND METHOD FOR DEPICTING A MONITORED STREAM OF DATA PACKETS

(71) Applicant: Triveni Digital, Inc., Princeton, NJ (US)

(72) Inventor: Tim Price, Marlton, NJ (US)

(73) Assignee: Triveni Digital Inc., Princeton, NJ (US)

( * ) Notice: Subject to any disclaimer, the term of this patent is extended or adjusted under 35 U.S.C. 154(b) by 0 days.

(21) Appl. No.: 18/293,795

(22) PCT Filed: Aug. 5, 2022

(86) PCT No.: PCT/US2022/039501
§ 371 (c)(1),
(2) Date: Jan. 31, 2024

(87) PCT Pub. No.: WO2023/018602
PCT Pub. Date: Feb. 16, 2023

(65) Prior Publication Data
US 2024/0251142 A1     Jul. 25, 2024

Related U.S. Application Data

(60) Provisional application No. 63/231,008, filed on Aug. 9, 2021.

(51) Int. Cl.
*H04N 21/854*     (2011.01)
*H04N 21/44*     (2011.01)
*H04N 21/454*     (2011.01)

(52) U.S. Cl.
CPC ..... *H04N 21/854* (2013.01); *H04N 21/44008* (2013.01); *H04N 21/454* (2013.01)

(58) Field of Classification Search
CPC .............................. H04N 21/44008
See application file for complete search history.

(56) References Cited

U.S. PATENT DOCUMENTS 6,950,124 B2    9/2005    Corl et al.
9,386,352 B1 *   7/2016    Shoykhet ............. H04N 21/472
(Continued)

FOREIGN PATENT DOCUMENTS

EP           2400756 A2 * 12/2011 ........... H04N 21/235

*Primary Examiner* — Anthony Bantamoi
(74) *Attorney, Agent, or Firm* — David Todd Shoneman; Michael A. Pugel

(57) ABSTRACT

A method and apparatus is described. The method includes receiving a media stream, that includes a video segment, determining, while receiving the media stream, when a portion of the video segment that is capable of generating a thumbnail image has been received and generating a thumbnail image for the video segment using the portion of the video segment based on the determination, and providing the generated thumbnail image for display. The apparatus includes a network interface that receives a media stream, the media stream including a video segment, a video signal processor configured to determine when a part of the video segment that is capable of generating a thumbnail image has been received and generate a thumbnail image for the video segment when it if determined that the part of the received for the video segment has been received, and a display interface for providing the thumbnail image for display.

13 Claims, 8 Drawing Sheets

(56) References Cited

U.S. PATENT DOCUMENTS

| | | | |
|---|---|---|---|
| 2007/0226767 A1* | 9/2007 | Kaminski | H04N 7/173 |
| 2013/0036233 A1 | 2/2013 | Orleth | |
| 2014/0095669 A1 | 4/2014 | Kang | |
| 2016/0064039 A1* | 3/2016 | Wu | G06K 9/00 |
| 2018/0352273 A1 | 12/2018 | Hughes et al. | |
| 2019/0019535 A1 | 1/2019 | Elsner | |
| 2019/0149885 A1 | 5/2019 | Madison et al. | |
| 2020/0169788 A1* | 5/2020 | Clift | H04N 21/4622 |

* cited by examiner

APPARATUS AND METHOD FOR DEPICTING A MONITORED STREAM OF DATA PACKETS

This application claims the benefit, under 35 U.S.C. § 365 of International Application PCT/US2022/039501, filed Aug. 5, 2022, which was published in accordance with PCT Article 21(2) on Feb. 16, 2023, in English and which further claims the benefit of provisional application U.S. 63/231,008, filed on Aug. 9, 2021.

TECHNICAL FIELD

The present disclosure generally relates to the field of monitoring a digital video signal stream in a communication system and more particularly towards generating a depiction of one or more monitored streams of video packets from a digital television broadcast system on a display device.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure.

The advent of advanced broadcast signal transmission standards, such as the Advanced Television Systems committee (ATSC) 3.0 set of standards, and the corresponding transmission technologies makes manipulation of the data streams more difficult across broadcast content distribution networks than in previous networks that use legacy broadcast signal transmission standards, such as ATSC 1.0. Many television distribution networks using the advanced standards rely on a variety of technologies to move the media content that will ultimately constitute the television broadcast from the origination point, typically the main studio, to the transmission antenna.

A digital television (DTV) signal (a transport stream multiplex of packets) is formed of multiple packets, some of which represent video data, some which represent audio data and some of which represent metadata. The metadata is used by a DTV receiver to reconstruct the packetized DTV signal for a given virtual channel. A terrestrial DTV broadcaster's bandwidth, or physical channel, can contain multiple virtual channels, where each channel can contain a program or some other content.

A DTV signal can conform to the Moving Picture Experts Group (MPEG) 2 standard. An MPEG-2 Transport Stream is defined as a number of fixed-length packets. Each packet has a four-byte header that contains a synchronization byte, a packet identification number, a continuity count and several control bits. The transport stream multiplex is a complex arrangement of separate, mostly-independent information.

The process of analyzing or visualizing the contents of such a stream involves a large volume of data that has a relatively high complexity. For example, a high definition television (HDTV) broadcast that complies with the American Television Standards Committee (ATSC), i.e., an ATSC-compliant HDTV broadcast, will minimally contain data that includes at least 10 separate packet identifiers (PIDs), and packets will be sent at a rate of approximately 2.4 million bytes of data, or 12.9 thousand packets, per second. And this merely represents a relatively simple transport stream. Streams with multiple standard digital television (SDTV) programs and full electronic program guide (EPG) support (another type of metadata) can include dozens of PIDs.

Understanding and visualizing such a great amount of data at even low rates can often be very confusing. The known monitoring systems provide a means of selecting specific packets based on PIDs and a pre-existing knowledge of packet location in the stream (packet occurrence). The display of these packets is done by providing a capture and/or display of the actual digital contents of a single packet along with some formatting to identify particular portions of the packet. As a result of the deficiencies and issues associated with the signals and processes described above, there is a need for an improved mechanism for depicting a monitored stream of packets and, in particular, a monitored broadcast media stream of packets.

SUMMARY

According to one implementation, a method for generating a thumbnail image is described. The method includes receiving a first media stream, the first media stream including a video segment. The method further includes determining, while receiving the first media stream, when a portion of the video segment that is capable of generating a thumbnail image has been received and generating a thumbnail image for the video segment using the portion of the video segment based on the determination. The method additionally includes providing the generated thumbnail image for display.

According to another implementation, an apparatus for generating a thumbnail image is described. The apparatus includes a network interface that receives a first media stream, the first media stream including a video segment. The apparatus also includes a video signal processor coupled to the network interface, the video signal processor configured to determine when a part of the video segment of the first media stream has been received and generate a thumbnail image for the video segment when it if determined that the part of the received for the video segment has been received. The apparatus additionally includes a display interface coupled to the video signal processor, the display interface providing the thumbnail image for display.

According to one implementation, a method for generating a thumbnail image is described. The method includes receiving a set of media streams simultaneously, each one of the set of media streams including at least one video segment. While receiving each of the at least one video segment in each one of the set of media streams, determining when a percentage of the video segment of the first media stream that exceeds a threshold percentage value has been received. The method further includes generating a thumbnail image for the at least one video segment in each one of the media streams when it if determined that the percentage of the at least video segment in each one of the media streams that exceeds the threshold percentage value has been received and providing the generated thumbnail image for display. The threshold percentage value is determined by retrieving, from a memory, data associated with the generation of thumbnail images for the at least one video segment included in each one of the set of media streams over a predetermined period of time, determining a value for a ratio of video segments for which a thumbnail image was successfully generated before a video segment used to generate the thumbnail image was completely received to the for the at least one video segment included in each one of the set of media streams for the predetermined period of time, determining a value for a ratio of video segments completely received that have a thumbnail image available to the for the at least one video segment included in each one of the set of media streams for the predetermined period of time and modifying the threshold percentage value based on the value determined for the ratio of video segments for which a thumbnail image was successfully generated and the value determined for the ratio of video segments completely received.

BRIEF DESCRIPTION OF THE DRAWINGS

The above and other aspects, features, and advantages of the present disclosure will become more apparent in light of the following detailed description when taken in conjunction with the accompanying drawings to which the principles of the present disclosure are applicable.

DETAILED DESCRIPTION

Figure 1:
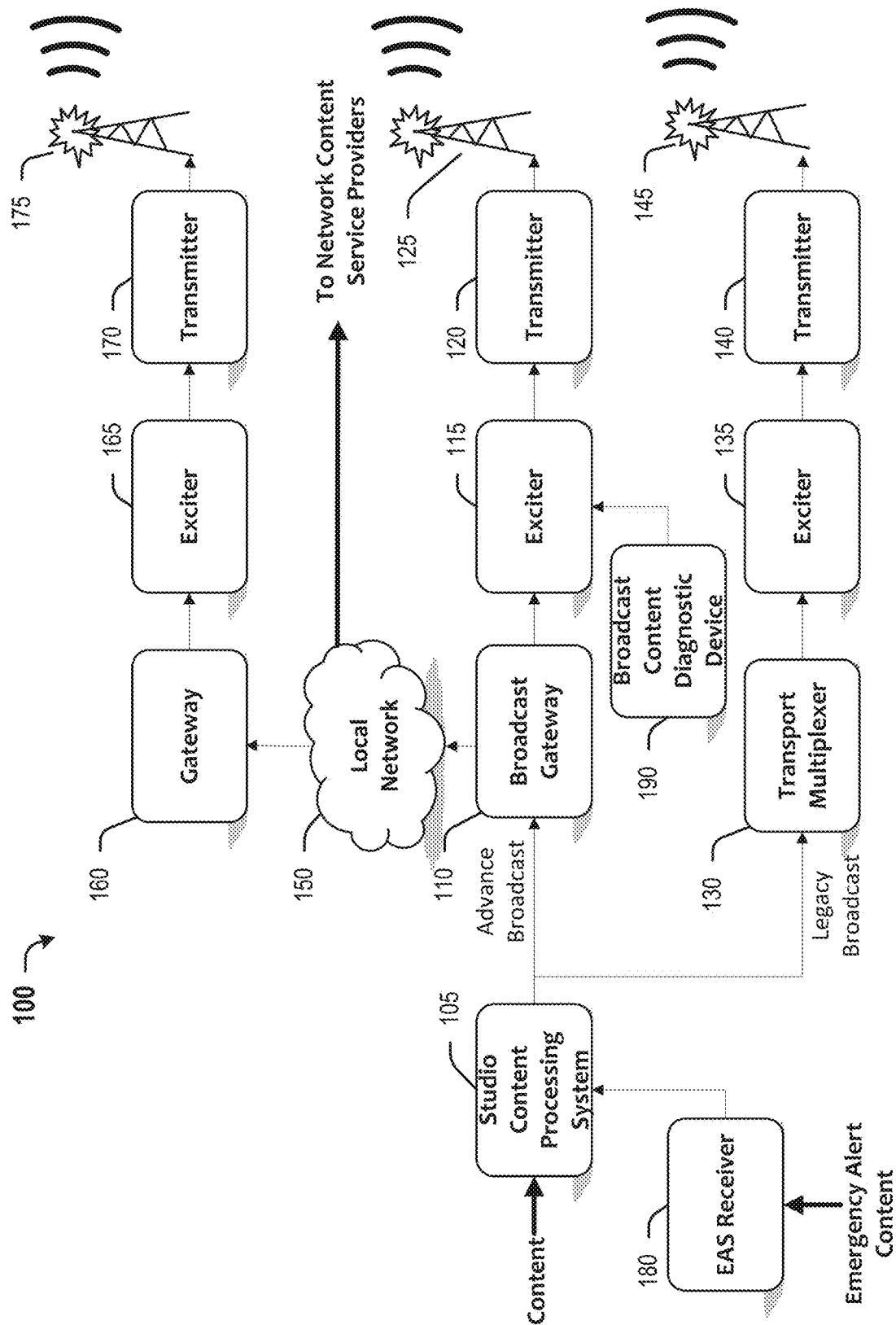
FIG. 1 is a block diagram of an exemplary broadcast content distribution system, according to aspects of the present disclosure.

It should be understood that the elements shown in the figures may be implemented in various forms of hardware, software, or combinations of one or more appropriately programmed general-purpose devices, which may include a processor, memory, and input/output interfaces. Those skilled in the art will be able to devise various arrangements which, although not explicitly described or shown herein, embody the principles of the disclosure and are included within its scope.

All examples recited herein are intended to aid the reader in understanding the principles of the disclosure and the concepts and are to be construed as being without limitation to such specifically recited examples and conditions. Any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "module" or "controller" should not be construed to refer exclusively to hardware capable of executing software, and may implicitly include, without limitation, a system on a chip (SoC), digital signal processor ("DSP") hardware, read only memory ("ROM") for storing software, random access memory ("RAM"), and nonvolatile storage.

As used herein, the term "processor" broadly refers to and is not limited to a single- or multi-core general purpose processor, a special purpose processor, a processor, a Graphics Processing Unit (GPU), a DSP, a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), an SoC, and/or a state machine. As used herein, the terms "transaction" and "electronic transaction" broadly refer to any transaction which may be electronically validated by the recited system, method, and apparatus.

One or more of the aspects of the embodiments described above may be implemented using application-specific hardware. Further, one or more aspects of the embodiments may be implemented using one or more processing elements, such as central processing units (CPUs) that may include specific operating instructions embedded as firmware in the processing element(s) or may operate from software code that is downloaded into the elements from one or more memory units coupled to the processing element(s).

The present disclosure addresses issues related to generating and depicting media streams containing data packets, in particular video segments, that are being monitored within a communication system, such as a broadcast communication system. For example, in the ATSC 3.0 specification, audio and video data is packaged in fixed time length segments of short duration, typically one or two seconds. ATSC 3.0 also specifies multiple processing nodes in the chain from the production of these audio and video segments to its eventual consumption by an end receiver. These processing nodes are collectively referred to herein as a "broadcast chain" within the broadcast communication system. Diagnostic devices that can monitor signals and diagnose issues along the broadcast chain can be used to extract frames from the video segments in the media streams, process the frames to combine them if needed, decrease the resolution to make it more compact, and generate a representation of the segment as a "thumbnail" image. Users, operators, or technicians (hereinafter "operators") can view the thumbnail image on a display to confirm the video contents of a media stream are correct.

Extracting a single frame or only a few frames to represent a video segment is more efficient, particularly with the compute-intensive encoding specified by ATSC 3.0. Even though extracting these frames is less compute intensive than decoding an entire video segment, the process of generating thumbnail images for each of the video segments can still be compute intensive. Further, since the same media stream may be monitored at multiple points along the broadcast chain, the diagnostic device may receive the completion of a given video segment from each node in the chain at roughly the same time. This means that waiting for the segment to finish before extracting a thumbnail can cause multiple thumbnails to be extracted concurrently, which multiplies the amount of compute power necessary to extract the thumbnail. The issues may further be compounded by the multiplexing of more than one video stream in the same broadcast chain, which tends to lead to video segments of different media streams completing at close to the same time period causing further demand spikes of computing resources on a periodic basis.

The present disclosure addresses some of the issues described above by describing a mechanism to initiate the generation of thumbnail images for the video segments in the media streams while the video segments are still being received. In many cases, it is not necessary to wait until segments are completely received. A portion of a video segment may contain enough information to allow a thumbnail image to be generated. In other words, a device such as a diagnostic device can determine when a percentage of the video segment's data is received and attempt to generate a thumbnail image while the remainder of the video segment's data is still being received.

Simply generating thumbnails when a percentage of the video segment's data is received instead of when it is completely received does not completely address issues associated with spikes in computing resource usage when more than one media stream is received and processed to generate thumbnail images representing video segments of the media streams. The present disclosure further addresses these issues by describing a mechanism to limit the number of thumbnail images that can concurrently be generated. The mechanism may be used to account for various operational parameters in the diagnostic device, such as the number of processing units that are available as well as other hardware limitations. These parameters may be used to determine a thread pool size for simultaneously generating thumbnail images while also ensuring that as many thumbnail images as possible are generated before video segments are completely received. The mechanism produces a smoother utilization of processor capability while also ensuring the best experience for operators.

Advantages of the present disclosure will become more apparent from the detailed description given hereinafter. However, it should be understood that the detailed description and specific examples, while indicating preferred embodiments of the present disclosure, are given by way of illustration only, since various changes and modifications within the scope of the present disclosure will become apparent to those skilled in the art from this detailed description.

FIG. 1 illustrates a block diagram of an exemplary broadcast content distribution system 100 according to aspects of the present disclosure. In broadcast content distribution system 100, content from one or more content sources is provided to studio content processing system 105. Studio content processing system 105 is coupled to broadcast gateway 110. Broadcast gateway 110 is coupled to exciter 115. Exciter 115 is coupled to transmitter 120. Transmitter 120 is coupled to the transmitter antenna 125, which radiates a broadcast signal provided from transmitter 120 into the airwaves. Studio content processing system 105 is also coupled to transport multiplexer 130. Transport multiplexer 130 is coupled to exciter 135. Exciter 135 is coupled to transmitter 140. Transmitter 140 is coupled to the transmitter antenna 145, which radiates a broadcast signal provided from transmitter 140 into the airwaves. Broadcast gateway 110 is also coupled to gateway 160 through local network 150. Gateway 160 is coupled to exciter 165. Exciter 165 is coupled to transmitter 170. Transmitter 170 is coupled to the transmitter antenna 175, which radiates a broadcast signal provided from transmitter 170 into the airwaves. Local network 150 also interfaces with one or more network content service providers to provide data representing studio content to users of the network content services. Emergency alert content from one or more emergency alert sources is provided to emergency alert system (EAS) receiver 180. EAS receiver is coupled to studio content processing system 150. DTV diagnostic device 190 is coupled to ATSC 3.0 exciter 115.

Most broadcast signals, as well as many communication signals, rely on a set of standards in order to maintain compatibility between the signal transmission and the signal receivers used for receiving the signal transmission. Most standards further implement the communication structures within various elements and signals based on protocol layers, starting at the physical radio frequency (RF) layer, referred to as the physical (PHY) layer, and moving lower through to the network layer, transport layer, and finally, the lowest or application layer. Aspects of the present disclosure utilize the various relationships that can exist between various elements and signals of each of the protocol layers.

Nominally, the studio content processing system 105, broadcast gateway 110, exciter 115, transmitter 120, and antenna 125 are collocated (e.g., in the same building or facility) and represent a broadcast signal transmission mechanism for delivering broadcast signals for use by the public within a first geographic area. As such, the transmitter 120 is configured as the main or original transmission source of a broadcast signal. Further, the transport multiplexer 130, exciter 135, transmitter 140, and transmitter antenna 145 may also be collocated at or near the same geographic location and provide the same or similar broadcast signals but using a different transmission format. Additionally, gateway 160, exciter 165, transmitter 170, and transmitter antenna 175 may be collocated at a geographic location that is different from the location of the elements mentioned above and may represent a broadcast signal transmission mechanism for delivering broadcast signals for use by the public within a second or different geographic area using either the same or a different transmission format. It is worth noting that the configuration of broadcast content distribution system 100 represents one or many possible configurations which may take advantage of the principles of the present disclosure.

Media content (e.g., audio, video, and/or data signals) as well as data associated with the media content is received by studio content processing system 105. The studio content processing system 105 may include one or more devices for processing media content for delivery and/or transmission through broadcast content distribution system 100. The studio content processing system 105 may include, but is not limited to, encoders, packagers, signal converters, and the like. The media content may be provided from one or more media content sources including, but not limited to, content production studios, content distribution companies, broadcast content providers, and the like. Media content may also be provided from alternative content sources such as websites, content subscription service companies and interactive applications providers. Data content may also be provided by one or more of the above-mentioned content sources as well as from specific data content sources such as media content listing or content guide services companies. The media content and/or the data content may be provided as raw digital data that is unencoded and unencrypted, particularly with respect to any broadcast standard protocols. The studio content processing system 105 processes the media and data content from the various content sources to produce one or more content streams. The content streams may be encoded and/or compressed using one or more media content encoding or compression protocols including but not limited to, MPEG-2, MPEG-4, MPEG-4 advanced video coding (AVC), and MPEG-H Part-2 high efficiency video coding (HEVC). Some of these content streams may further be formatted into internal protocol packets based on any one of several possible network friendly protocols. For example, the streams may be formatted as Real-time Transport Protocol (RTP)/User Datagram Protocol (UDP)/internet protocol (IP) multicast streams as part of data source layer processing. In some embodiments using ATSC 3.0 transmission standards, the streams may be formatted as Real-time Object Delivery over Unidirectional Transport (ROUTE) or MPEG Media Transport (MMT) packets. Some of these multicast streams allow the IP packets destined for broadcast signal receivers to be tunneled through any IP network without need to provide special routing or other consideration for the receiver IP address space. Tunneling is a networking mechanism that allows data in any format across diverse networks. In some embodiments, the content streams are further formatted using a data source transport protocol (DSTP) as described in the ATSC standard A/324.

One or more of the content streams from studio content processing system 105 are provided to broadcast gateway 110 as part of an advance broadcast communication. Broadcast gateway 110 processes the one or more content streams and formats the signals into a broadcast signal transport stream. Broadcast gateway 110 processes one or more of several different types of elementary streams that may include packet formatting that is consistent with delivery as IP packets but can be adapted for delivery in a broadcast transport stream. As such, the processing in broadcast gateway 110 includes encapsulating and formatting the IP packets in the one or more content streams into link layer packets as part of a baseband data packet stream based on a specific transport protocol. In some embodiments, broadcast gateway 110 encapsulates the one or more content streams by adding a data link layer based on the ATSC Link Layer Protocol (ALP) described in ATSC Standard A/330 that carries the IP packets provided by studio content processing system 105 over the ATSC 3.0 broadcast standard physical layer. The encapsulation may further provide the mapping of some or all of the IP packets extracted from the content streams into sub-streams within the broadcast streams, often referred to as physical layer pipes (PLPs).

The processing in broadcast gateway 110 also includes packet management or scheduling in order to convert the broadcast signal transport stream into a stream containing baseband data packets suitable for processing by the exciter 115. The broadcast gateway 110 also generates a network configuration and control stream as well as a preamble stream as part of the scheduling operation. In some embodiments, the network configuration and control stream may be referred to as a timing and management control data stream. The broadcast signal transport stream, including the network configuration and control stream and preamble data stream, are used by exciter 115 to create the broadcast emission signal waveform. In some embodiments, one or more packets of the broadcast signal transport stream may be tunneled using a protocol such as the studio to link transport protocol (STLTP) as described in ATSC standard A/324 as part of an ATSC broadcast. Further, in some embodiments, the tunneled packets may include a security mechanism, such as a packet or stream signature, allowing exciter 115 to determine if the packet or stream has been tampered with. Information associated with packet or stream security associated with the present disclosure will be described in further detail below.

Exciter 115 receives the broadcast signal transport stream, along with the network configuration and control stream and preamble data stream, from the broadcast gateway and provides additional link layer signal processing to the streams to form the broadcast emission signal based on the network configuration and control stream and preamble data stream. The link layer signal processing may include one or more forms of data error correction encoding, temporal interleaving encoding, and data signal modulation. The data error correction encoding may include, but is not limited to, Reed-Solomon encoding, Viterbi encoding, Bahl, Cocke, Jelinek, and Raviv (BCJR) encoding, and low-density parity check (LDPC) encoding. The data signal modulation may include but is not limited to vestigial sideband (VSB) modulation, multi-level quadrature amplitude modulation (QAM), and multi-level orthogonal frequency modulation (OFDM). The resulting broadcast signal is converted from a digital format signal to an analog format baseband or low frequency signal and further upconverted to a frequency for transmission as analog transmission signal. In some embodiments the frequency for transmission may be in the very high frequency (VHF) range from 54 megahertz (MHZ) to 88 MHz and 174 MHz to 216 MHz or in the ultra-high frequency (UHF) range from 470 MHz to 868 MHz. The exciter 115 may also apply analog signal transmission precorrection to account for known or anticipated signal distortion caused by signal amplification in transmitter 120.

It is important to note that the link layer signal processing, data signal modulation, and signal up-conversion used by exciter 115 may conform to one or more of several broadcast signal physical layer broadcast standards. Such broadcast standards include, but are not limited to, ATSC 3.0, the digital video broadcasting (DVB) standard DVB-T2, and the integrated services broadcasting (ISDB) standard ISDB-T.

Transmitter 120 receives the analog transmission signal from exciter 115 and amplifies the signal from its received signal level of around one milliwatt (mW) to a level between one kilowatt (KW) and ten kW. Transmitter 120 may perform the amplification in stages and may include signal filtering between the stages as well as at the output in order to remove signal distortion artifacts and other undesired signal energy outside of the desired frequency range for the transmitted signal. It is worth noting that the type and amount of amplification and filtering that is used in transmitter 120 may affect the type and necessity for analog signal transmission precorrection that may be applied by exciter 115. The amplified RF transmission signal is provided to transmitter antenna 125 for emission as an over the air broadcast signal. The transmitter antenna 125 may include one or more antenna elements that are arranged and/or configured to provide the necessary or desired radiated emission pattern in order to provide the proper geographic cover area for the RF transmission signal. As illustrated, transmitter antenna 125 is incorporated as part of a communication tower that may be 50 or more feet tall. In some embodiments, transmitter antenna 125 may be incorporated as part of other structures including, but not limited to, a residential or commercial dwelling, a utility pole, a bridge, and the like.

One or more of the content streams from studio content processing system 105 are also provided to transport multiplexer 130 as part of a legacy broadcast communication.

Transport multiplexer 130 operates in a similar manner to broadcast gateway 110 but is intended to process different types of content streams. More specifically, transport multiplexer 130 is configured to process one or more elementary broadcast signal streams having uniform packets that can be rearranged into a single broadcast transport stream while broadcast gateway 110 is configured, as described above, to process one or more content streams into different types of streams that are based on packet protocols such as transport control protocol/internet protocol (TCP/IP) and formats these stream into a complex broadcast signal transport stream. As such, the processing in transport stream multiplexer 130 includes identifying and, formatting and combining the one or more elementary content streams into a broadcast transport stream. The processing may also include PID remapping as well as service remapping and generation and insertion of service information tables directly into the broadcast transport stream. In some embodiments, transport multiplexer 130 processes content streams consistent with the ATSC A/53 and A/73 standards.

Exciter 135 receives the broadcast signal transport stream from the transport multiplexer 130 and provides additional link layer signal processing to the streams to form the broadcast emission signal. The link layer signal processing may include one or more forms of data error correction encoding, temporal interleaving encoding, and data signal modulation similar to that described above for exciter 115. The resulting broadcast signal is converted from a digital format signal to an analog format baseband or low frequency signal and further upconverted to a frequency for transmission as analog transmission signal in transmitter 140 in a manner similar to that described above.

It is important to note that the link layer signal processing, data signal modulation, and signal up-conversion used by exciter 135 may conform to one or more of several broadcast signal physical layer broadcast standards. Such broadcast standards include, but are not limited to, ATSC 1.0 and DVB-T.

Transmitter 140 receives the analog transmission signal from exciter 135 and amplifies the signal to a level between one kW and ten kW as described above for transmitter 120. The amplified RF transmission signal is provided to transmitter antenna 145 for emission as an over the air broadcast signal. Transmitter antenna 145 may be configured and operates in a manner similar to that described for antenna 125 above. Further, in some embodiments, antenna 125 and antenna 145 may be incorporated as part of the same communication tower or other structure.

The broadcast signal transport stream, along with the network configuration and control stream and preamble data stream, from the broadcast gateway 110 is also provided through local network 150 to gateway 160. Local network 150 may be configured to deliver data as signals between various devices connected to local network 150 using an IP. The local network 150 may use various arrangements and other facilities or devices (not shown) to physically connect the devices together including, but not limited to, a microwave communications link, a high-speed fiber communications link, a lower speed copper wire communications link, and cellular or wi-fi communications link.

Gateway 160 processes the one or more baseband content streams and formats the streams into one or more broadcast signal transport streams for use by exciter 165. The processing in gateway 160 includes encapsulating and formatting the IP packets contained in the one or more content streams into link layer packets as part of the baseband streams used as part of the re-broadcast of the received signal based on a specific transport protocol as described above for broadcast gateway 110.

It is worth noting that the processing capability in gateway 160, which may be referred to as an edge gateway device, differs in several aspects to broadcast gateway 110. For example, it is not common or, in many cases, practical, to use broadcast gateway 110, and similar broadcast gateways, as an edge gateway device for internet type communication due to the fact that a broadcast transmission channel does not have available bandwidth for a return communication path across the broadcast network. Further, gateway 160, and similar edge gateways, typically provide routing functionality that require only support for validating a limited key signing security system while broadcast gateway 110, and similar broadcast gateways, are configured to support a private key signing security system, such as is used in many broadcast content transmission protocols, a function not typically employed as part of an edge gateway. Gateway 160, and similar edge gateways, also can be controlled using a management stream that is included as part of the data provided in the streaming content allowing unattended operation.

Exciter 165 receives the broadcast signal transport stream (s) containing the one or more content streams from the gateway 160 and provides additional link layer signal processing to the streams to form a broadcast emission signal and, finally, an analog transmission signal, for re-broadcast in a manner similar to that described above for exciter 115. The one or more baseband streams are similar to the content streams received from broadcast gateway 110, as described above, may include, among other elements, a network configuration and control stream and a preamble data stream. Transmitter 170 receives the analog transmission signal from exciter 165 and amplifies the signal in a manner similar to that described above for transmitter 120. The amplified RF transmission signal is provided to antenna 175 for emission over the air as described above for antenna 125. It is worth noting that the frequency that is used for the analog transmission signal in exciter 165 may be the same as, or different from, the frequency used for the analog transmission signal from exciter 115 depending on the signal transmission format and/or protocol used.

It is worth noting that the configuration in FIG. 1, that includes gateway 160, exciter 165, transmitter 170, and transmitter antenna 175, allows for a re-transmission of all or a portion of the broadcast signal transmitted by transmitter antenna 125 from transmitter 120. It is therefore expected that the geographic location of the transmission facility and the transmitter antenna 175 will be different from the geographic location of transmission facility and transmitter antenna 125.

EAS receiver 180 is configured to detect and receive emergency events that are broadcast as part of a separate network, such as the emergency broadcast network. If an emergency event is detected and received by EAS receiver 180, the information is provided to the studio content processing system 105. The studio content processing the system 105 processes the information and may insert the processed information into one or more of the content streams. In one embodiment, the processed information may be inserted into the secondary video and audio service portion of the broadcast signal transport stream.

Broadcast content diagnostic device 190 is capable of being coupled into a component, or broadcast device, in the broadcast content distribution system 100 and monitoring the signals passing into and/or out of the component. Broadcast content diagnostic device 190 may be coupled using a wireless connection and/or a wired connection. The monitored signals are further processed to perform signaling identification and verification, services and system table analysis, multicast data packet analysis, RF and other physical layer signal data analysis, rules event analysis, and electronic service guide (ESG) analysis. Further, broadcast content diagnostic device 190 provides a user input interface for selecting and controlling the monitoring and analysis functions. The broadcast content diagnostic device 190 also includes the capability to record and store the monitored signals along with the analysis functions. The broadcast content diagnostic device 190 may further the capability to display video or produce audio output through a GUI. The broadcast diagnostic device 190 also includes the capability to provide control signals to one or more of the other elements in broadcast content distribution system 100.

It is worth noting that while broadcast content diagnostic device 190 is shown in FIG. 1 as coupled to exciter 115, broadcast content diagnostic device 190 may be coupled and utilized at various points within the broadcast content distribution system 100 including, but not limited to, studio content processing system 105, transport multiplexer 130, gateway 160, and the like. Broadcast content diagnostic device 190 may also be utilized for receiving the transmitted broadcast signal at various points within the geographic region covered by the broadcast transmission. Further Information regarding operation of a diagnostic device, such as broadcast content diagnostic device 190, will be described in detail below.

In operation, media content is provided from a number of content sources to studio content processing system 105. Studio content processing system 105 processes the content streams to form one or more media streams. The media streams are further processed in various other components, or broadcast devices, in broadcast content distribution system 100 for delivery to either users or viewers as a broadcast transmission signal as part of operating in a first operating mode. For example, broadcast gateway 110 may receive a media stream from a first content source through studio content processing system 105 and provide the media stream for broadcast transmission through exciter 115, transmitter 120, and transmitter antenna 125, as part of a first operating mode. The media streams may also be processed in some of the broadcast devices in broadcast content distribution system 100 for delivery to network content service providers. The network content service providers may further deliver some or all of the media streams to users or viewers using an alternative content delivery method, such as a cable signal distribution network, IP streaming service, and the like.

The broadcast content diagnostic device 190 is configured to monitor and/or analyze the operation of various aspects of the broadcast devices described above along with any signals and data that are produced by, or communicated in the broadcast communication network between, those components. For example, the broadcast content diagnostic device 190 can be configured to access and/or receive one or more of the signals communicated and processed by a broadcast device, such as broadcast gateway 110 or exciter 115. The signals and/or data may collectively be referred to as media streams as almost all communication generated and communication between broadcast devices is formatted in some form of a media stream. The broadcast diagnostic device 190 processes these media streams to identify and/or extract the video content segment of the media stream. The video segment may be arranged in portions, also referred to as fragments. The arrangement may be based on a type of video compression algorithm utilized to encode the video content at the studio content processing system 105. For example, a video compression algorithm utilized to encode the video content may be compliant with MPEG-4 part 10.

While receiving a video segment included in the media stream(s), broadcast diagnostic device 190 determines when a portion of the video segment can be used to generate a thumbnail image for the video segment. When broadcast diagnostic device 190 determines that the received portion can be used to start generating the thumbnail image, then broadcast diagnostic device 190 generates the thumbnail image for the video segment and provides the generated thumbnail image for display. In some embodiments, the received video segment may include a key frame located within the video segment. A key frame is a frame of video generated as part of the encoding process of the video segment by a video compression algorithm that has limited or no reliance on information about previous or future frames of video. As a result, a key frame may often be used to generate the thumbnail image. For example, a key frame may be an I-frame encoded as part of an MPEG video compression algorithm. Broadcast diagnostic device 190 may identify the location of the key frame in the video segment and use this information as the part of determining when enough of the video segment has been received to generate the thumbnail image. In other embodiments, the received portion may be predetermined or may be adaptively determined using an algorithm. It is worth noting that more than one video segment from media streams may be received simultaneously and processed to generate thumbnail images as described here.

In some embodiments, if broadcast diagnostic device 190 determines that the entire video segment included in one or more streams has been received and has not initiated generating a thumbnail image for the video segment, broadcast diagnostic device 190 may proceed to generate the thumbnail image external display device and provide the generated thumbnail image for display. In some embodiments, the generated thumbnail image may also be stored in a memory in diagnostic device 190.

As described above, the broadcast content diagnostic device 190 may be coupled to various components in the broadcast content distribution system 100. The broadcast diagnostic device 190 may also be coupled at various points along the signal communication link between the various components. The place or position where the broadcast diagnostic device 190 is coupled into broadcast content distribution system 100 may be referred to as a location. In some embodiments, one or more of the components in broadcast content distribution system 100 may be at the same physical or geographic location while other components may be at different physical or geographic locations. For clarity purposes, the term location, as used herein, refers to the components, or signal communication points, themselves rather than the actual physical or geographic locations for those components or signal communication points.

Figure 2:
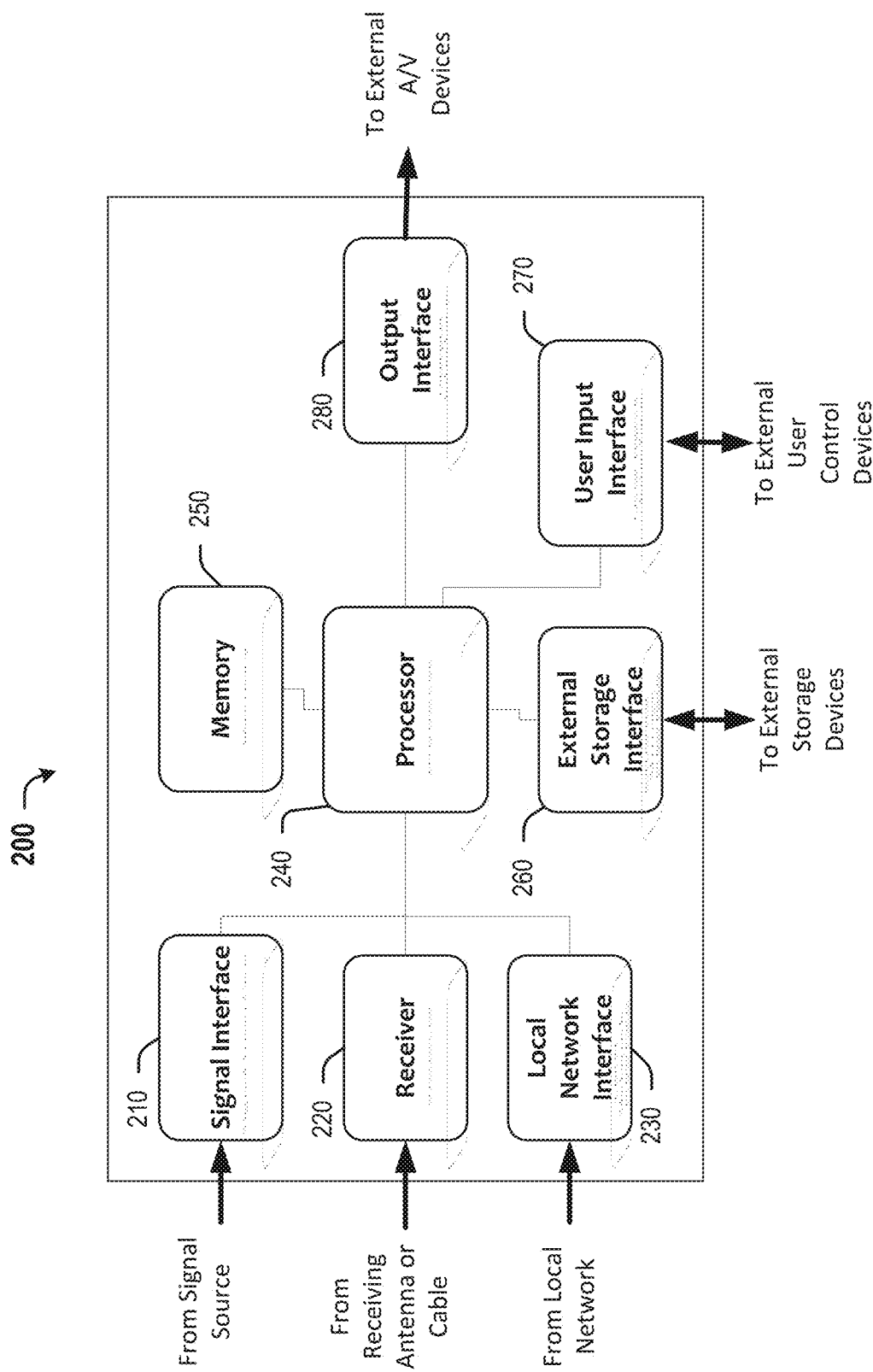
FIG. 2 is a block diagram of an exemplary diagnostic device used in a signal communication system, according to aspects of the present disclosure.

FIG. 2 illustrates a block diagram of an exemplary diagnostic device 200 according to aspects of the present disclosure. The diagnostic device 200 may operate in a manner similar to broadcast content diagnostic device 190 described in FIG. 1. The diagnostic device 200, which may also be referred to as a media stream analyzer, may be used in conjunction with monitoring the operations and signals in a broadcast content distribution system 100. Diagnostic device 200 may also be used as part of monitoring operations and signals in other content or information delivery systems or networks. Signals from a signal source (e.g., studio content processing system 105 in FIG. 1) are provided to signal interface 210. Signal interface 210 is coupled to processor 240. A signal that is transmitted or broadcast from a signal transmission device (e.g, antennas 125, 145, and/or 175) is provided to receiver 220. Receiver 220 is coupled to processor 240. A signal that is communicated on a local network (e.g., local network 150) is provided to local network interface 230. Signal interface 210, receiver 220, and local network interface are each coupled to processor 240. Processor 240 is coupled to memory 250. Processor 240 is also coupled to external storage interface 260 which communicates with external storage devices. Processor 240 is additionally coupled to user interface 270 which communicates with, and receives inputs from, external user control devices. Processor 240 is further coupled to output interface 280 which provides audio and/or video signals to external audio/visual (A/V) devices. It is worth noting that some elements or components that may be necessary for proper operation of diagnostic device 200 are not shown or described here for the sake of conciseness as they are well known to those skilled in the art.

Signal interface 210 receives signals through a direct connection to a device used in a signal communication system (e.g., studio content processing system 105, exciter 115, etc. in FIG. 1). Signal interface 210 may provide some signal processing, such as signal reformatting and analog to digital conversion, in order to provide the signals to processor 240 for analysis. Signal interface 210 may include one or physical interface components, such as Radio Communication of America (RCA) standard phone jacks, or other devices and circuits, such as asynchronous serial interface (ASI) and the society of motion picture and television engineers (SMPTE) 310.

Receiver 220 receives a broadcast signal through an externally connected RF receiver antenna (not shown) or through a coaxial cable connected to a broadcast cable network or device (not shown). The broadcast signal will have signal energy within a specific region or band of frequencies, typically between six and ten MHz in bandwidth, within the VHF and UHF range. The receiver 220 may include one or more suitable RF connectors, such as F-type connectors, mounted on the diagnostic device 200 for connecting to the RE receiver antenna and/or coaxial cable. The receiver 220 tunes and demodulates the broadcast signal to generate a signal that can be processed for analysis in processor 240. The tuner/demodulator 210 can be controlled to perform its processing based on a specific broadcast signal transmission protocol (e.g., ATSC 3.0, ATSC 1.0) using control signals from processor 240 based on selections and/or user inputs made through user interface 270. The components or elements used in receiver 220 may include, but are not limited to, filters, amplifiers, frequency down-converters, analog to digital signal converters, multi-phase multi-amplitude demodulators, error correction decoders, and the like. The components or elements may be combined or integrated into one or more larger components, such as integrated circuits or multi-chip modules. In some cases, one or more of the elements may be implemented as part of firmware or software in a digital signal processor.

Local network interface 230 provides a communication interface to a local network (e.g., local network 150 in FIG. 1) that is used in operation of a communication network (e.g., broadcast content distribution network 100). Local network interface 230 includes circuitry to perform signal processing functions for receiving signals that are present and being communicated between devices connected on the local network (e.g., broadcast gateway 110 and gateway 160). The received signals are decoded and provided to processor 240 as part of the monitoring and analysis operations. The signal processing functions in local network interface 230 may include protocol configuration used for operation on local networks, such as Ethernet or wireless networks. Local network interface 230 may also transmit data, such as protocol acknowledgments or access requests generated by processor 240 to the local network for delivery to one or more of the connected devices. Local network interface 230 also includes an interface connector suitable for the type of communication medium used with the local network. The interface connector may include, but is not limited to, an F-type coaxial connector, a straight tip (ST) type optical connector, a registered jack (RJ) type RJ-11 or RJ-45 connector, a mechanical transfer registered jack (MT-RJ) type connector, and the like. Local network interface 230 may also include one or more antennas that may be configured for use with wireless operation as part of the local network.

Processor 240 receives the one or more signals containing data and information from the signal interface 210, receiver 220, and/or local network interface 230. Processor 240 may further process the signal(s) to separate out groups of data packets from any sub-streams present in the signal(s). Processor 240 may separate packets that are intended for analysis and/or display based on, for instance, the selections made by an operator through user interface 270. Processor 240, may perform analysis on the one or more signals, such as averaging or correlation of various data and information in the signal(s). Processor 240 may also reformat any of the data, either received or generated, as needed for further processing in other components, such as output interface 280. For example, the data received may be in the form of a content stream for broadcast transmission and processor 240 may reformat the content stream for delivery to output interface as a high definition multimedia interface (HDMI) signal. In this manner, a portion of processor 240 can be configured to perform various audio and/or video signal processing functions.

Processor 230 further receives status information as well as information about any received signals from sign interface 210, receiver 220, and/or local network interface 230, processes the information, and provides any control command information back to those elements. Processor 230 may also receive control instructions for specific operations for monitoring and analysis to be performed by diagnostic device 200 from external devices (e.g., through local network interface 230) in the broadcast signal distribution system (e.g., another diagnostic device). Processor 230 processes the control instructions and provides the necessary control information to the various elements in diagnostic device 200 to perform the specific operations.

It is worth noting that processor 240 may be embodied using a programmable microprocessor that is reconfigurable with downloadable instructions or software code stored in memory 250. Processor 240 may alternatively be a specifically programmed processing circuit configured as an audio/video signal and/or data processor as well as a controller with internal control code for controlling, managing, and processing all functions and data in diagnostic device 200. Further, one or more of the elements described in transceiver 200 may be combined into a larger component and may be implemented as a programmable microprocessor or as a specifically programmed processing circuit. In an embodiment, processor 240 includes circuitry configured as a video signal processor capable of generating thumbnail images from video content.

Memory 250 supports the operation of processor 240, as well as the other elements of diagnostic device 200, by storing and retrieving programming instructions and data associated with the control and operation of the diagnostic device 200. Memory 250 may also store and retrieve one or signals received through signal interface 210, receiver 220, and/or local network interface 230, during processing and analysis in processor 240. Memory 250 may include one or more of the following storage elements including, but not limited to, RAM, ROM, Electrically Erasable Programmable ROM (EEPROM), and flash memory. Memory 250 may also encompass one or more integrated memory elements including, but not limited to, magnetic media hard disk drives and optical media disk drives, that are housed with diagnostic device 200.

External storage interface 260 provides an interface to connect external storage devices (not shown) to diagnostic device 200 for additional storage capability. The external storage interface 260 may process the data signals in order to facilitate data transfer between the external storage devices and processor 240. The additional storage may be necessary, for instance, for capturing and storing, or recording, large portions of one or more signals or elements present in the signal communication system (e.g., broadcast content distribution system 100 in FIG. 1) for present or later review and further analysis. The external storage devices may include, but are not limited to, electronic flash storage drives, magnetic media hard disk drives, and optical media disk drives. External storage interface 260 may include the physical connectors as well as circuitry for using one or more of the various signal protocols associated with storage devices including, but not limited to, universal serial bus (USB) and personal computer memory card international association (PCMCIA).

User interface 270 provides a mechanism for receiving inputs from a user in order to facilitate control and operation of diagnostic device 200. User interface 270 may include a user input or entry mechanism, such as a set of buttons, a keyboard, or a microphone. User interface 270 may also include circuitry for converting user input signals into a data communication format to provide to processor 240. User interface 270 may further include some form of user notification mechanism to show device functionality or status, such as indicator lights, or small display. User interface 270 may also include circuitry for converting data received from processor 240 into signals that may be used to operate the user notification mechanism.

Output interface 280 allows connection to one or more audio and/or video reproduction devices (not shown), such as a display device, display monitor, television, audio speakers and the like. Output interface receives an audio and/or video signal that has been generated in processor 240 and processes the signal(s) for delivery to the reproduction device. Output interface 280 may include additional signal processing circuitry including, but not limited to, digital to analog converters, signal filters, digital and/or analog signal format converters, modulators, and the like. Output interface also includes one or more physical connectors to connect to the audio/video reproduction device using one or more of several different types of audio/video connecting cables. The one or more physical connectors may include, but are not limited to, RCA or phone type connectors, HDMI connectors, digital visual interface (DVI) connectors, Sony/Philips digital interface (S/PDIF) connectors, Toshiba Link (Toslink) connectors, and F-type coaxial connectors.

Diagnostic device 200 performs three main functions as a part of a signal communication system, inputting of media streams, monitoring and analysis of those media streams, and providing results of the monitoring analysis to audio/visual devices for use by an operator as well as other devices in the communication system. Diagnostic device 200 includes the capability to receive signals and media streams in multiple formats, including elementary streams and service streams (e.g., Route/MMTP, MPEG-2, Ethernet, and the like), transport layer streams (e.g., broadcast transport, STLTP, ALP, and the like), and RF or physical layer streams or signals (e.g., ATSC 1.0 broadcast, ATSC 3.0 broadcast, and the like), as well as IP signals created at any of these layers. Diagnostic device 200 can monitor any one of these media streams from any of these layers that are received at one of the inputs (e.g., signal interface 210, receiver 220, and local network interface (230). The diagnostic device 200 can further perform analysis on any of the media streams as well as validate many of the data structures and formatting based on various signal standards (e.g., ATSC 1.0, ATSC 3.0, and the like). The diagnostic device 200 can further analyze and validate various data tables, schedules, and program data, found in the media streams including, but not limited to, service map table (SMT), service list table (SLT), service layer signaling (SLS), extended file delivery table (EFDT), electronic service guide (ESG), and the like. The diagnostic device can additionally map and analyze information and data contained in the media streams that is configured using multicast IP.

The diagnostic device 200 further includes the capability to produce analysis outputs that may be provided to other broadcast devices based on rules or rule sets for various characteristics associated with the signals or media streams. The rules or rule sets may be input by the operator (e.g., through user input interface) or may be pre-loaded into diagnostic device 200.

The diagnostic device 200 additionally includes the capability to provide real-time video and/or audio streams representing signals at any of the layers (e.g, elementary stream or service, transport, and physical layers) including displaying the video portion of a media stream as a series of thumbnails. The diagnostic device device 200 also includes the capability to record and manage some or all of the media streams (e.g, using an external storage device connected to external storage interface 260) using a stream capture tool such as packet capture (PCAP). The diagnostic device 200 can also generate and provide for display the status (such as frequency of occurrence, object buffering of any indicators, tables, or maps for the signals as either a data table or in some type of graphical representation.

The diagnostic device 200 further includes user friendly features including color mapping as part of displaying multiple signals or media streams simultaneously, the capability to import and export configuration files to other diagnostic devices, and user management control tools that facilitate remote access to the information and data that has been input to, or stored in, diagnostic device 200.

In operation, data associated with a video segment included as part of one or more media streams is accessed or received at signal interface 210, receiver 220, and/or local network interface 230. The signal(s) may be accessed or received at any one of the locations in the signal communication system (e.g., at a component, at a signal communication link coupling the components, or at a separate geographic location in the signal communication system). The media stream(s) may be a lower level type signal (e.g., a video stream, an IP stream, and the like) or may be a higher level more complex type signal (e.g., a radio frequency broadcast signal, a transport stream, a service stream, and the like). In one embodiment, the signal communication system is a broadcast communication system, such as broadcast content distribution system 100 in FIG. 1 and the received media streams are DSTP service streams that comply with the ATSC 3.0 standard. The signal(s) are provided to the processor 240 in order to process for analysis.

The processor 240, as part of processing the received signal(s), identifies the video segment included in the media stream(s). While receiving the identified video segment, processor 240 determines when a portion of the video segment that is capable of generating a thumbnail image has been received. In some embodiments, the determination may include identifying a key frame in the video segment, as described above. In some embodiments, the determination may utilize a threshold value for a percentage of how much of the video segment has been received. The threshold may be predetermined or entered by an operator. For example, the threshold value may be 50 percent. In some embodiments, the threshold value may be provided as an initial value and further adapted based on a heuristic algorithm that is performed by processor 240. In some embodiments, the threshold value may be determined completely based on a heuristic algorithm. Processor 240 initiates the generation of a thumbnail image from the received portion of the video segment based on the determination. The thumbnail image is used to represent the video segment. Once the thumbnail image that represents the video segment is generated, the thumbnail image is provided for display (e.g., through output interface 280).

In some embodiments, when the portion of the video segment that has been received is not enough (e.g., less than a threshold value for a percentage of the video segment) or is not capable of generating a thumbnail image, processor 240 may determine whether all of the video segment has been received. For instance, the accessing or receiving or the video segment at diagnostic device 200 may not be initiated at the beginning of the video segment. As a result, the portion of the video segment being received may not start at the beginning of the video segment and the end of the video segment may be reached before enough of the video segment has been received. In other instances, the portion of the video segment that is received does not include a key frame. In some embodiments, processor 240 may determine that the end of the video segment has been reached by identifying an indicator in a header included in a packet as part of the last portion. Processor 240 may further identify the start of a subsequent video segment and use this information to indicate that all of the current video segment has been received. When processor 240 determines that all of the video segment has been received and further determines that the generation of a thumbnail image for the video segment has not been initiated, processor 240 initiates generation of a thumbnail image as described above. The generated thumbnail image is further provided for display to the operator.

In some embodiments, diagnostic device 200 may receive more than one media stream concurrently. These concurrent media streams may be different streams from different services that have been generated, distributed, and/or transmitted as part of a communication system (e.g., broadcast content distribution system 100 in FIG. 1). In some instances, one media stream may be the same as another concurrently received media stream but is provided from a different content source or from a different location or device in the system. Processor 240 may further include the capability of generating more than one thumbnail image simultaneously or concurrently for the concurrently received media streams. Depending on the capabilities of processor 240, a limit value may be placed on how many thumbnail images may be generated simultaneously or concurrently before performance for generating all thumbnail images is impacted. In such cases, as the diagnostic device 200 adds a media stream to the number of concurrently received media streams that require generation of thumbnail images, processor 240 may determine if the generation of a thumbnail image for the video segment included in the added media stream equals a maximum number of concurrently generated thumbnails. The maximum value may be predetermined as part of operation of diagnostic device 200. For a maximum value of five concurrently generated thumbnails may be used. If it is determined that the generated thumbnail image for the added media stream equals the maximum number of concurrently generated thumbnails, processor 240 prevents further generation of thumbnail images for any additional concurrently received media streams at diagnostic device 200.

Figure 3:
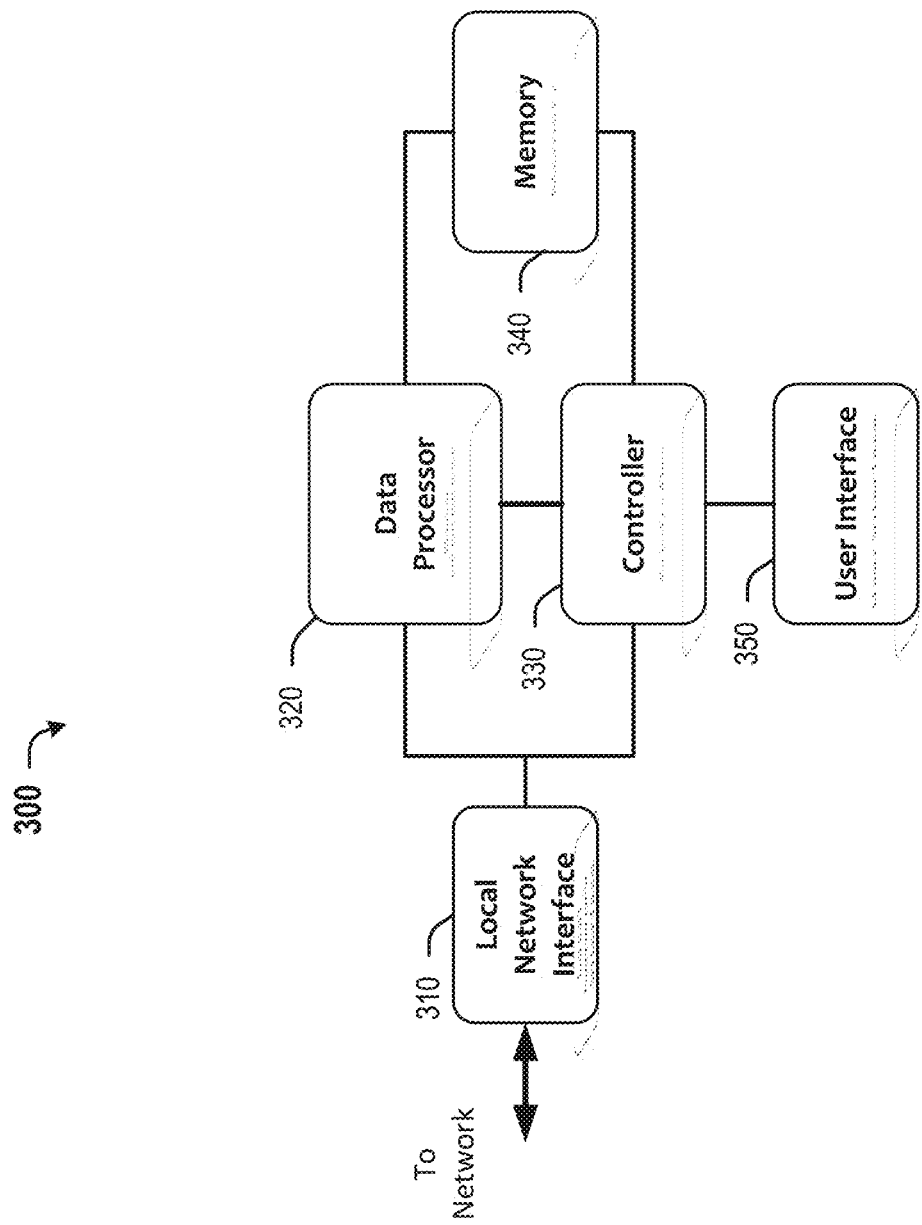
FIG. 3 is a diagram of a exemplary gateway device used in a signal communication system, according to aspects of the present disclosure.

FIG. 3 shows an exemplary software structure 300 used as part of a diagnostic device, such as diagnostic device 200, according to aspects of the present disclosure. Software structure 300 may be included as part of a processor in the diagnostic device (e.g., processor 240). Software structure 300 may be configured as programmable or downloadable software code or firmware as part of the hardware elements in the processor element. Software structure 300 represents the core software elements for implementing the generation of thumbnails asynchronously before the data, such as video segments, have been completely received and/or processed by the diagnostic device. In software structure 300, one or more media streams (e.g., stream(s) from a broadcast signal) may be provided from another part of the diagnostic device (e.g., signal interface 210, receiver 220, and local network interface 230) to the core processing threads element 310 through other elements of the processor. The core processing threads element 310 is communicatively coupled to the task queue 320 as well as the thumbnail table 340. task queue 320 and thumbnail table 340 are further coupled to the thumbnail generation threads elements 330. The core processing threads element 310 further outputs analysis information related to the received data.

The core processing threads element 310 receive data packets or segments in the one or more media streams and process the data packets or segments based on a scheduling priority established by a process controller or process manager in the processor in the diagnostic device (e.g., processor 240 in FIG. 2). The scheduling priority mechanism utilizes a threading structure. Each of the packets of data may be processed using a different processing task. For example, a packet that is video content may require a video processing task, while a packet that is audio content may require an audio processing task. Each of the packets may be assigned to one or more threads that are associated with performing a specific processing task. A thread represents a basic unit to which a processing system can allocate processing time for the processing task. The organization and management of these threads allow a processor to run more than one processing task at the same time by allocating processing resources to each of the threads for a limited amount of time based on a schedule. In the present embodiment, the core processing threads element 310 is configured to perform the task of receiving the media stream(s), extracting one or more portions of a video segment from the media stream(s), reassembling the portions of the video segment into a video stream, and enqueueing a request for generating the thumbnail when certain criteria are met for doing so.

The core processing threads element 310 primarily performs monitoring and analysis services or tasks on the various data packets or segments in the media stream(s). As a result of the monitoring and analysis, the core processing threads element 310 generates analysis information related to the media stream(s). The analysis information may include, but is limited to, data values for analysis of characteristics of the media stream(s), comparison data from the analysis, failure indications from the analysis, and the like. The core processing threads element 310 may further be configured to perform the tasks of receiving the media stream(s), extracting video segments from the media stream(s), reassembling video segments into a video stream, and enqueueing a request for generating the thumbnail when certain criteria are met for doing so.

The task queue 320 is configured to operate as a specific task controller or manager for thumbnail generation threads element 330. The task queue 320 is used to provide a scheduling message to the thumbnail generation threads element 330 that a video segment has met a defined threshold for generating a thumbnail image. The scheduling message may be provided from the core processing threads element 310 or from another element in the processor (e.g., processor 240 in FIG. 2). The task queue 320 may operate as a first in first out queue manager for the scheduling of messages or may further allow one or both of specific timing management as well as time delay or deferral information as part of the message scheduling. The task queue 320 may also provide the received portion of each video segment from the one or more media streams to the thumbnail generation threads element 330. Alternatively, the received portion(s) may be provided through an alternate path, such as through thumbnail table 340. The task queue 320 is preemptable, meaning that messages may be removed from the queue based on the status of the video segment.

Thumbnail generation threads element 330 is configured to process portions of a video segment for the one or more media streams based on a scheduling priority mechanism utilizing a threading structure in a manner similar to core processing threads element 310. More specifically, thumbnail generation threads element 330 receives portions of video segments along with an instruction or message to begin generating thumbnail images for each of the portions. In some embodiments, the thumbnail generation threads element 330 may be configured to extract an I-frame from the portion of the video segment and use the I-frame to generate a thumbnail image. In some embodiments, the thumbnail generation threads element 330 may utilize other elements or data from the portion of the video segment to generate the thumbnail image. If there was no I-frame in the portion of the video segment, or the thumbnail generation threads element 330 is unable to generate a thumbnail image, an indication of that condition may be stored in the thumbnail table 340. It is important to note that in some embodiments, each one of the threads in the thumbnail generation threads element 330 may be configured to generate one thumbnail image from the video segment. As a result, the size of the thread pool, or the number of threads, in thumbnail generation threads element 330 may determine how many thumbnail images may be generated concurrently or simultaneously.

Both the core processing threads element and the thumbnail generation threads element make use of thumbnail table 340 as a common table where video segment data including completed thumbnail images may be stored. The data structure in thumbnail table 304 may store information about each video segment whose thumbnail image needs to be generated or has already been generated. The data structure may also contain the data content of all or a portion of each video segment as well as other metadata needed for generating the thumbnail image as described above. Each successfully generated thumbnail image for a video segment included in the one or more media streams may be stored in the thumbnail table 340 for retrieval by core processing threads element 310 as part of providing the thumbnail image for display. In some embodiments, thumbnail generation threads element 330 may generate thumbnail images for the video segment asynchronously with other processing to monitor and/or analyze the media streams in the core processing threads element 310 as described above. The analysis information may be provided for display along with the generated thumbnails as part of a GUI. In some situations, the thumbnail image generated by thumbnail generation threads element 330 may be retrieved from thumbnail table 340 and provided for display by core processing threads element 310 before the video segment represented by the thumbnail image has been completely received.

In operation, a video segment from each of the one or more media streams that were concurrently received is accessed and processed in core processing threads element 310. As the video segment(s) are being received, accessed, and processed, the amount of each of the video segment(s) that has been received is monitored. When the amount received for a video segment exceeds a threshold level or value, as described above, an entry is made in thumbnail table 340 for that video segment and a request to generate a thumbnail image representing that video segment is sent to task queue 320.

One of the threads in the thumbnail generation threads element 330 reads the message from the task queue 320 and begins generating a thumbnail image using the information in the amount of the video segment that has been received. If a thumbnail is successfully generated, it is stored in the thumbnail table 340. If a thumbnail image cannot successfully be generated, such as due to insufficient information, the failure is also indicated in thumbnail table 340.

If the all of a video segment is received, core processing threads element 310 checks thumbnail table 340 to see if a thumbnail image has been generated or failed to be generated for that video segment. Core processing threads element 310 further checks to see if there is a request to generate a thumbnail image for that video segment still pending in task queue 320. If the thumbnail image has been successfully generated or failed to be generated, the thumbnail image may be retrieved from thumbnail table 340, if available, and provided for display. If there is an outstanding request to generate a thumbnail image for that video segment in task queue 320, the request is removed and task queue 320 is preempted to request thumbnail generation threads element 330 to generate a thumbnail image for that video segment immediately. Core processing threads element 310 then accesses another video segment from the one or more media streams and repeats the process again, as described above.

Figure 4:
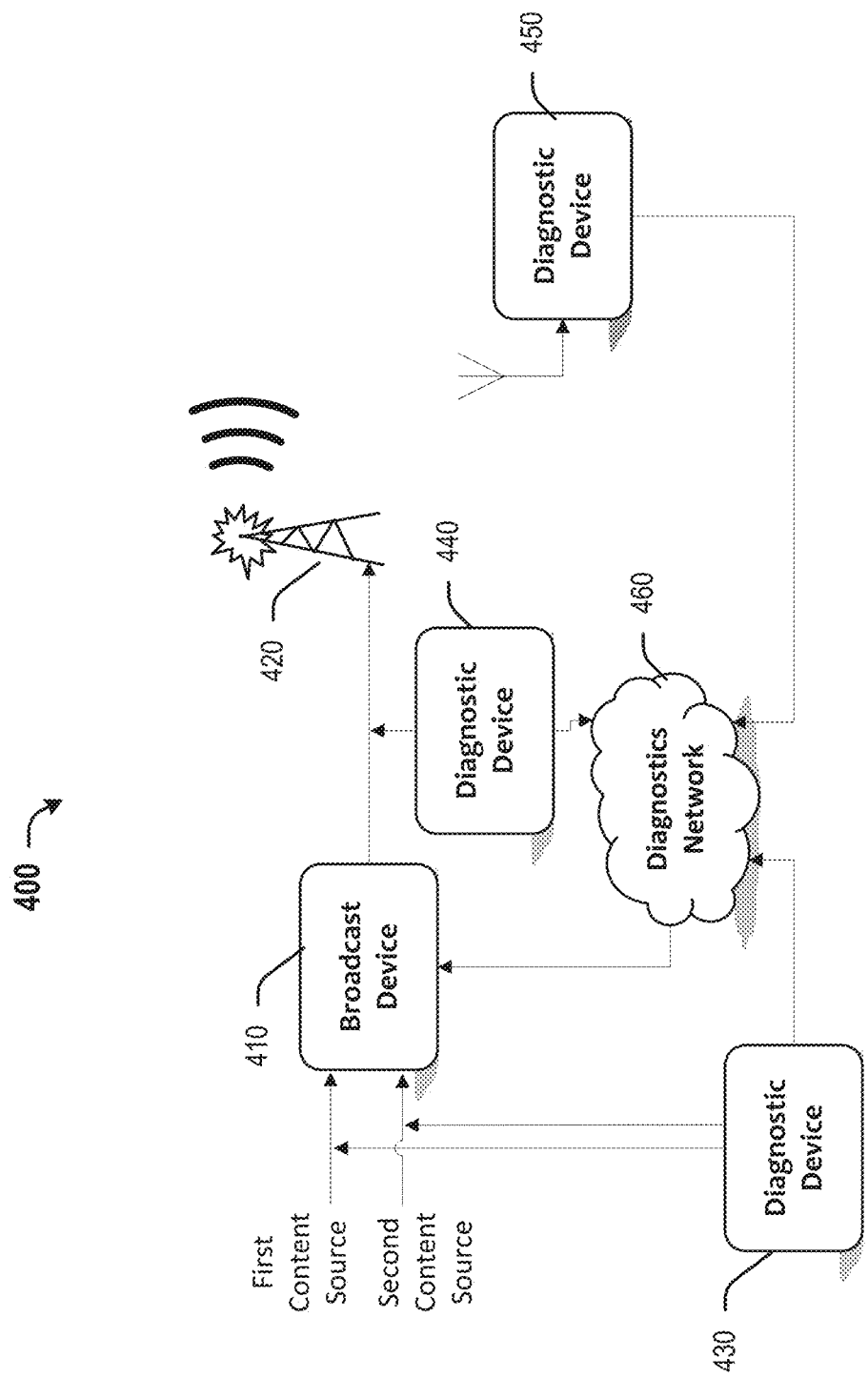
FIG. 4 is an exemplary screenshot of a graphic user interface (GUI) associated with the operation of a diagnostic device, according to aspects of the present disclosure.

FIG. 4 shows an exemplary screenshot 400 of a GUI associated with the operation of a diagnostic device, such as diagnostic device 200, according to aspects of the present disclosure. Screenshot 400 illustrates another dashboard associated with monitoring and analyzing the quality of service (QOS) and bitrates for services or media streams as well as depicting one or more data segments that are part of services being generated, distributed, and/or transmitted within a communication system, such as broadcast content distribution system 100 described in FIG. 1. The dashboard may be generated and/or configured by an operator using editing functions (not shown) as part of an initial set-up of the GUI on the diagnostic device. Screenshot 400 includes two tabs 405 and 410, labeled "QoS & Bitrate" and "System Resources" respectively. Tab 405 is highlighted as selected and has been configured to display a listing of content sources 420*a*-420*e* as primary content sources for one or more media streams associated with services from those content sources. Each of the content source listings 420*a*-420*e* includes a down arrow that can be used to access any lower level signals from the content, such as individual media streams. Each of the content source listings 420*a*-420*e* further include a selection box to allow an operator to select that content listing for monitoring and/or analysis, along with identification information for each content source. As shown, count source 420*d*, "transport Ethernet (eth2)" and content source 420*e*, "Transport RF (DTA0) 473 mhz)" have been selected. When selected, the selection box further displays a QoS value for any content (e.g., audio, video, and/or data) received from that content source through the diagnostic device. A column 415 also provides a value for bit rate for each of the content sources 420*a*-420*e*

In addition to the selection of content source 420*e*, a listing for a service 425*e*, labeled "service AtemeHD", that is available from content source 420*e* is also shown as selected. It is worth noting that service 425*e* is shown below content source 420*e* and indented to the right to indicate that service 425*e* is associated with content source 420*e*. Service 425*e* also shows a QoS value as part of the selection box and a bitrate value in column 415, as described above.

A set of three display components 430, 440, and 450, shown below service 425*e*, include data associated with the monitoring and/or analysis of one or more elements in the service. The display components 430, 440, and 450 have been configured (e.g., by the operator during set-up of the GUI) to display a representation of the data from various types of characteristics for service 425*e*. As shown, display component 430 is configured to display a series of thumbnail images over time representing the video content of a media stream included in the service. The current thumbnail image for screenshot 400 is shown. The thumbnail images may be generated using one or more aspects of the embodiments described in the present disclosure. Display component 440 is configured to display a graph of bitrates over time and display component 450 is configured to display the current QoS and bitrate for each of the streams that are part of service 425*e*, including the media stream used to generate the thumbnails for display component 430. It is worth noting that although screenshot 400 illustrates a dashboard that displays five content sources with one content source having one service for which three display components are shown, other embodiments may include dashboards more or fewer content sources, services, and display components as well as different types of each.

Figure 5:
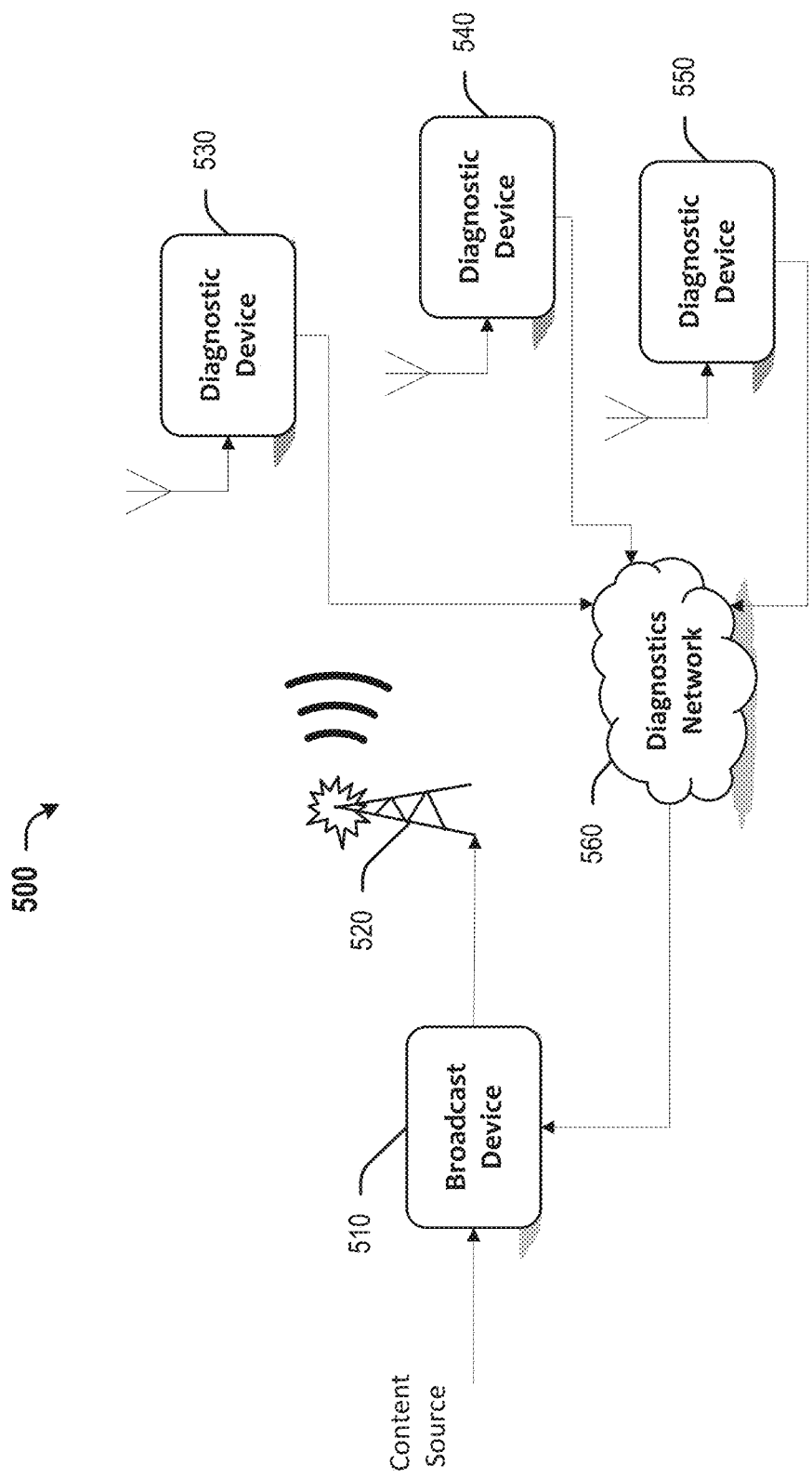
FIG. 5 is another exemplary screenshot of a graphic user interface (GUI) associated with the operation of a diagnostic device, according to aspects of the present disclosure.

FIG. 5 shows another exemplary screenshot 500 of a GUI associated with the operation of a diagnostic device, such as diagnostic device 200, according to aspects of the present disclosure. Screenshot 500 illustrates another dashboard associated with monitoring and analyzing the QoS and bitrates for services or media streams as well as depicting one or more data segments that are part of services being generated, distributed, and/or transmitted within a communication system, such as broadcast content distribution system 100 described in FIG. 1. The dashboard in screenshot 500 may be generated and/or configured by an operator using editing functions in a manner similar to that described for screenshot 400 in FIG. 4. Screenshot 500 illustrates a dashboard that includes a search entry panel 505. Search entry panel 505 includes a dropdown selection box for delimiting a scope of search for services containing all or specific parameters, along with an entry box for typing in a search word or phrase for the service and a checkbox to apply or not case sensitivity to the search word or phrase. Screenshot 500 also includes a panel 510 that shows the total number of services from all available content sources within the system along with the number of unique services that are present in the system. Screenshot 500 further includes a series of three panels 520, 530, and 540 arranged vertically. Each of the three panels 520, 530, and 540 have service identifiers shown in column 550, labeled "2-CTVMS", "2-DECAD", and "2-GRIT". The three panels 520, 530, and 540 may be included in screenshot 500 as a result of entering a search to show services with names that contain "all" parameters and include "2" in search entry panel 505.

Each of the panels 520, 530, and 540 includes four sets of display components 555, 560, 565 and 570, with each of the four sets display components aligned in columns for each panel. Each one of the sets of display components 555, 560, 565, and 570 have been configured to display a representation of values associated with the same set of characteristics for the respective services in panels 530, 540, and 550 similar to that described in FIG. 4. The set of display components 555 is configured to simultaneously display a series of thumbnail images over time representing the video content of a media stream included in each of the services in panels 520, 530, and 540. The current thumbnail images for each of the services 530, 530, and 540 in screenshot 400 are shown. The thumbnail images may be simultaneously generated using one or more aspects of the embodiments described in the present disclosure. The set of display components 560 is configured to display a listing of values for QoS and bitrate for each of the communication layers (e.g., Source, Physical, Transport, Service) received at the diagnostic device (e.g., diagnostic device 200 in FIG. 2) associated with the communication signal that contains each of the services 530, 530, and 540. The set of display components 565 is configured to display a graph of bitrates over time and the set of display components 570 is configured to display the current QoS and bitrate for each of the streams that are part of service, similar to that described in FIG. 4.

As described above, although screenshot 500 illustrates a dashboard that display three services based on a specific search entered by an operator, with each of the three services including four display components, other embodiments may include dashboards configured display more or fewer, as well as different, services based on different searches, and may include more or fewer, as well as different types of each display components for the services.

Figure 6:
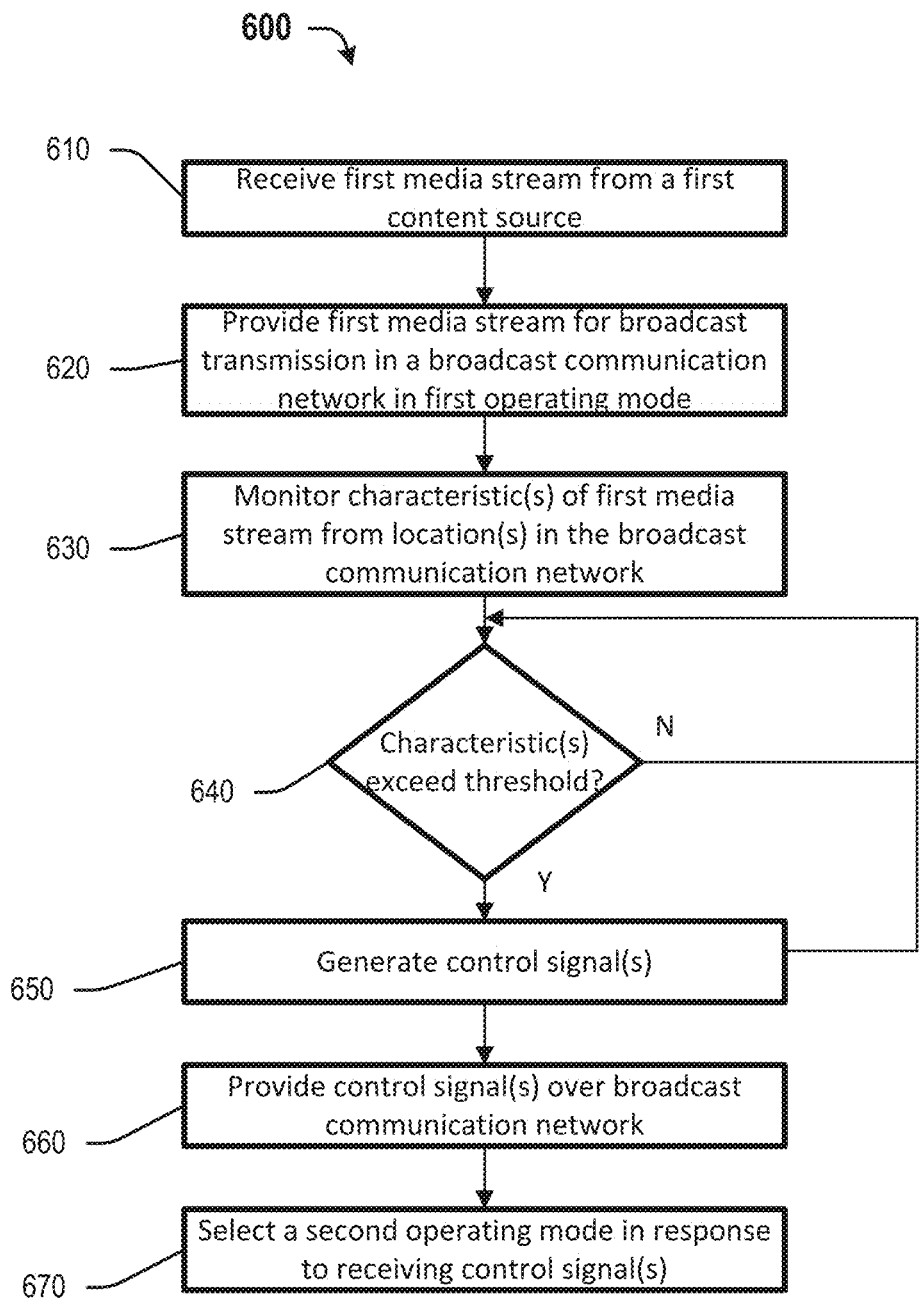
FIG. 6 is a flow chart of an exemplary process for depicting video content from media streams in a signal communication system, according to aspects of the present disclosure.

FIG. 6 illustrates a flow chart of an exemplary process 600 for depicting video content from media streams in a signal communication system according to aspects of the present disclosure. Process 600 will be primarily described with respect to diagnostic device 200 described in FIG. 2. One or more aspects of process 600 may equally apply to broadcast content diagnostic device 190 included in broadcast content distribution system 100 described in FIG. 1. Additionally, one or more steps of process 600 may be included in a software structure used as part of a diagnostic device, such as software structure 300 described in FIG. 3. Further, one or more steps of process 600 may be performed in conjunction with a GUI, such as the GUI described in FIG. 4 and FIG. 5. Although process 600 depicts steps performed in a particular order for purposes of illustration and discussion, the operations discussed herein are not limited to any particular order or arrangement.

At step 610, data associated with a media stream is received. The media stream may be received through a network interface (e.g., signal interface 210, receiver 220, or local network interface 230) as part of being monitored through a diagnostic device (e.g., diagnostic device 200. The media stream may be composed of audio/video content as well as ancillary information such as program or service tables and/or program guide data. The received media stream may be part of one or more signals that are communicated within a broadcast communication network in broadcast content distribution system 100. The media stream may be any one or more of elementary streams, service streams, transport streams, or phy layer streams as described above. For example, the media stream may be a service stream that complies with the ATSC 3.0 standard. It is worth noting that the media stream received, at step 610, may be one of a set of media streams that can be concurrently received and processed using process 600.

The video content in the media stream is arranged in video segments. The arrangement may be based on a type of video compression algorithm used for encoding the video segments as part of processing for broadcast signal transmission. In some embodiments, each video segment contains at least one key frame. For example, the video segments may be encoded using a video compression algorithm that is compliant with a motion picture entertainment group standard, such MPEG-4 part 10, and the key frame may be an MPEG-4 part 10 I-frame.

At step 620, while receiving a video segment in the media stream received at step 610, a determination is made as to whether all of the video segment has been received. The determination, at step 620, may be performed by the signal processor (e.g., processor 240). In some embodiments, the determination, at step 640, may include identifying an indicator in a header included in a packet at the end of the video segment. In some embodiments, the size of the video segment, or other start and/or end information may be included in metadata associated with the video segment. This information may be used to indicate that all of the current video segment has been received.

If, at step 620, the determination is made that all of the video segment has been received, then at step 630, the generation of a thumbnail image representing the video segment is initiated. The generation of the thumbnail image, at step 630 may be performed by the signal processor (e.g., processor 240). In some embodiments, the generation may be performed as one thread in a multi-thread processor, such as thumbnail generation threads element 330 in FIG. 3. In some embodiments, the thumbnail image is generated using the key frame from the video segment. Other embodiments may utilize other methods of generating thumbnail images from video content as are well known to those skilled in the art. At step 660, the thumbnail image generated, at step 650, that represents the video segment being received at step 610, is provided for display. The generated thumbnail image may be provided to an output interface (e.g., output interface 280) that is connected to a display device. The generated thumbnail image may be also provided to a display element (e.g., a display screen) that is included in the diagnostic device (e.g., diagnostic device 200). At step 670, the generated thumbnail image is stored in a memory (e.g., memory 250). After storing the generated thumbnail image, at step 650, process 600 returns to step 610 to continue receiving the media stream.

If, at step 620, the determination is made that all of the video segment has not been received, then at step 660 a determination is made as to when a portion of the video segment that is capable of generating a thumbnail image has been received. The determination, at step 660, may be performed by a signal processor (e.g., processor 240). In some embodiments, the determination, at step 660, may include identifying the key frame (e.g., an I-frame) in the video segment, as described above. In some embodiments, the determination may utilize a threshold value for a percentage of how much of the video segment has been received. The threshold may have a predetermined value, such as 50 percent. In some embodiments, the threshold value may be provided as an initial value by an operator and/or may be further adapted based on a heuristic algorithm.

If, at step 660, it is determined that a portion of the video segment that is capable of generating a thumbnail image has not been received or the portion received is not capable of generating a thumbnail image, process 600 returns to step 610 to continue receiving the media stream. If, at step 660, it is determined that a portion of the video segment that is capable of generating a thumbnail image has been received, then, at step 670, a determination is made as to whether the thumbnail image being generated for the video segment included in the media stream received, at step 610, is less than or equal to a value for the maximum number of thumbnail images that can be concurrently generated. In some embodiments the value for the maximum number may be one. In these embodiments, the performance specifications of the signal processor (e.g., processor 240) may not allow the generation of more than one thumbnail image at a time without impacting overall operation of the diagnostic device (e.g., diagnostic device 200). In other embodiments that utilize a software structure, such as is described in FIG. 3, more than one thumbnail image may be generated simultaneously for more than one media stream containing video segments that are received concurrently. However in these embodiments, a value for a maximum number may still be necessary to prevent impacting overall operation of the diagnostic device.

It is worth noting that the diagnostic device may also monitor and/or analyze one or more other characteristics associated with the video segment of the media stream received, at step 610 including, but not limited to, QoS and bitrates, as described above. In these embodiments, the generation of the thumbnail image, at step 630, is asynchronous to the monitoring and/or analyzing of the one or more characteristics also being performed. As a result, the value for the maximum number of thumbnail images that can be concurrently generated may be adjusted based on other operations that are being performed in the diagnostic device.

If, at step 670, a determination is made that the thumbnail image being generated for the video segment included in the media stream received, at step 610, is not less than or equal to the value for the maximum number of thumbnail images that can be concurrently generated, at step 680, the generation of further thumbnails images representing additional video segments included in additional media streams that are received, at step 610, is deferred. The deferral at step 680 may be managed using a queuing controller or manager, such task queue 320 described in FIG. 3. The deferral at step 680 may include delaying providing a request to initiate the generation of a thumbnail image based on the availability of resources (e.g., threads in thumbnail generation threads element 330). In some embodiments, the deferral at step 680 may include preventing the generation of additional thumbnail images until the task queue receives an indication that resources have become available. Process 600 returns to step 610 to continue receiving the media stream.

If, at step 660, a determination is made that the thumbnail image being generated for the video segment included in the media stream received, at step 610, is less than or equal to the value for the maximum number of thumbnail images that can be concurrently generated, then, at step 630, the generation of a thumbnail image representing the video segment is initiated as described above. After storing the generated thumbnail image, at step 650, process 600 returns to step 610 to continue receiving the media stream.

It is worth noting that one or more of the steps of process 600 may be modified, steps may be added or omitted depending on a specific embodiment. In some embodiments, storing the thumbnail image, at step 650, may be done before, or at the same time as, providing the thumbnail image, at step 640. In some embodiments, the determination, at step 670, and deferring the generation of a thumbnail image, at step 680, may be omitted where these steps are not needed. In some embodiments, more than one media stream may be received concurrently, at step 610, with each of steps 620, 630, 640, 650, and 660 being applied to more than one video segment and more than one thumbnail image at the same time. For example, a second media stream that includes a video segment may be received concurrently with the first media stream, at step 610. A determination may be made, while receiving the second media stream, as to when a portion of the video segment included in the second stream capable of generating a thumbnail image has been received, at step 660. The generating of a thumbnail image, at step 630, for the video segment included in the second media stream may be initiated concurrently with the generation of the thumbnail image for the video segment included in the first media stream when it is determined that the portion of the video segment included in the second media stream has been received, at step 660. Further, the generating thumbnail for the video segment included in the second media may be provided for display, at step 640, and stored, at step 650.

Figure 7:
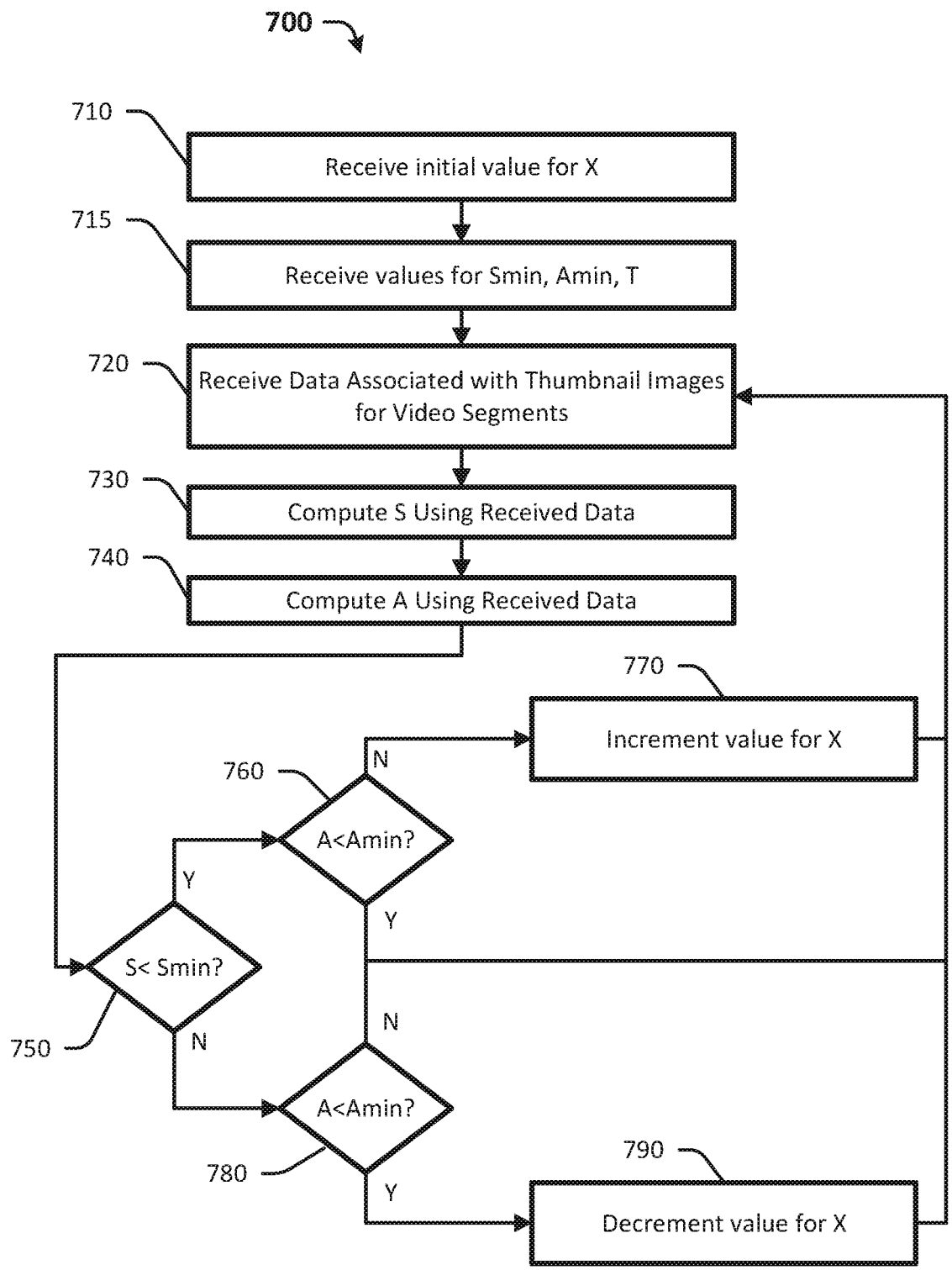
FIG. 7 is a flow chart of an exemplary process for determining the minimum percentage received for a video segment as part of generating a thumbnail image for the video segment, according to aspects of the present disclosure.

FIG. 7 illustrates a flow chart of an exemplary process 700 for determining the minimum percentage received for a video segment as part of generating a thumbnail image for the video segment, according to aspects of the present disclosure. Process 700 may be included in one or more steps of a process of depicting video content from media streams in a signal communication system as described above. For example, process 700 may be included as part of determining whether the portion of received video segment is capable of generating thumbnail images for video segments, at step 660 in process 600. Process 700 will be primarily described with respect to diagnostic device 200 described in FIG. 2. One or more aspects of process 700 may equally apply to broadcast content diagnostic device 190 included in broadcast content distribution system 100 described in FIG. 1. Additionally, one or more steps of process 700 may be included in a software structure used as part of a diagnostic device, such as software structure 300 described in FIG. 3. Further, one or more steps of process 700 may be performed in conjunction with a GUI, such as the GUI described in FIG. 4 and FIG. 5. Although process 700 depicts steps performed in a particular order for purposes of illustration and discussion, the operations discussed herein are not limited to any particular order or arrangement.

At step 710, An initial value is provided for the minimum percentage of a video segment that is to be received before generation of a thumbnail image is initiated. The minimum percentage, referred to as X, represents the portion of one or more of the video segments received as part of media stream(s) as described above. The initial value for X may be stored in a memory of the diagnostic device (e.g., memory 250 in diagnostic device 200 described in FIG. 2). The initial value for X may be entered by an operator through a user interface (e.g., user interface 270) during set-up of the diagnostic device for use in monitoring and/or analyzing the media stream(s). Alternatively, the initial value for X may be predetermined, such as a value entered during manufacturing or initial programming of the diagnostic device and stored in a memory (e.g., memory 250). The initial value for X may be retrieved from the memory as part of step 710. It is worth noting that only an initial value for X is provided, at step 710, as the value for X is dynamic. In other words, Process 700 may iteratively determine a new value for X over time based on the processing performance in one of the steps.

At step 715, a value is provided for a time period associated with process 700. The time period, referred to as T, represents the amount of time that data associated with the one or more video segments, including the initiating or generation of any thumbnail images, is received for one iteration of process 700, Also, at step 715, a value is provided for the minimum ratio of successful thumbnail image generation for incomplete video segments during a time period T. The minimum ratio of successful thumbnail image generation is referred to as the thumbnail generation threshold value, or Smin. Additionally, at step 715, a value is provided for the minimum ratio of completed segments for which a thumbnail image was generated prior to video segment completion during the time period T. The minimum ratio of completed segments is referred to as the completed segment threshold value, or Amin.

The values for T, Smin, and Amin may be provided to a video signal processor in the diagnostic device (e.g., processor 240 in diagnostic device 200). The values for T, Smin, and Amin may be predetermined or inherent to the diagnostic device, as described above, and may be stored in a memory (e.g., memory 250). The values for T, Smin, and Amin further may be entered by the operator through a user interface (e.g., user interface 270), as described above. It is worth noting that the values for T, Smin, Amin are not typically changed as part of the iterative operation of process 700. However, in some embodiments, the iterative operation of process 700 may be suspended and new values for T, Smin, and/or Amin may be entered by the operator. In some embodiments, the size of the thumbnail generation thread pool (e.g, thumbnail generation threads element 330 in FIG. 3) implemented as part of the processor (e.g., processor 240) may also be provided based on the configuration of the diagnostic device.

At step 720, data associated with one or more video segments as part of one or more media streams is received at a processor in the diagnostic device (e.g., processor 240 in diagnostic device 200). The data may be stored in a memory (e,g, memory 250). The data may include the number of video segments that were either partly or completely received during the time period T. The data may further include the number of thumbnail images for which generation was initiated but not completed and the number of thumbnails that were generated for the video segments that were either partly or completely received during the time period T. Further, the data may include the total number of attempts to generate thumbnail images for video segments that were not completely received, the number of attempts to generate thumbnail images for video segments that were not completely received that were successful, and the number of successfully generated thumbnail images that occurred before their corresponding video segments were completed. The data associated with the thumbnail images may be stored in a data table included in the software structure implemented in the processor (e.g., thumbnail table 340 described in FIG. 3).

At step 730, a value for the ratio of successful thumbnail image generation for incomplete video segments during the time period T is determined using the data received, step 720. The ratio, at step 730, is referred to as S. The value of S may be computed by dividing the number of thumbnail images successfully for incomplete video segments by the number of attempts to generate thumbnail images for incomplete video segments during the time period T. In other words, the value S provides an indication of the success rate of early thumbnail image generation. At step 740, a value for the ratio of completed segments for which a thumbnail image was generated prior to video segment completion during the time period T is determined also using the data received, at step 720. The ratio, at step 740, is referred to as A. The value of A may be computed by dividing the number of video segments for which a thumbnail image was generated before the video segment was completely received divided by the number of video segments completely received during the time period T. In other words, the value A provides an indication of the proportion of completely received segments whose thumbnail images were available when the video segment was completely received. The determination of values S and A may be computed in a processor in the diagnostic device (e.g., processor 240 in diagnostic device 200).

It is worth noting that the values S and A are very similar. However, they have subtly different effects on the determination of the value of X. For instance, a high value for X (e.g., a value of 99) can result in a very high value for S, but because the generation of thumbnail images takes a non-zero amount of time the segment could have completed before the generation of the thumbnail image was completed and/or the thumbnail image was extracted. As a result, the operation of process 700 would not improve the availability of thumbnail images when the video segments were completely received. By including the additional computation of A and decrementing the value of X when A<Amin, process 700 attempts to find a sweet spot, or a more optimal percentage of the video segment received, for initiating generation of thumbnail images so that the thumbnail images are likely to be available at or before the time the video segment is completely received.

At step 750, a determination is made as to whether the computed value for S is less than Smin. If, at step 750, the determination is made that S is less than Smin, then, at step 760, a determination is made as to whether the value for A is less than Amin. If, at step 760, the determination is made that A is not less than Amin, at step 770, the value for X is incremented. The value may be incremented in a predetermined level, such as incrementing by a value of one, where the value of X has a range of values from 1 to 100, representing a percentage of 1 percent to 100 percent of the video segment described above. After incrementing the value X at step 770, process 700 returns to step 720 to receive data associated with the generation of thumbnail images based on the periodic update established by the value for T. If, at step 760, the determination is made that A is less than Amin, at step 780, the value for X is unchanged and process 700 returns to step 720.

If, at step 750, the determination is made that S is not less than Smin, then, at step 780, a determination is made as to whether the value for A is less than Amin. If, at step 780, the determination is made that A is less than Amin, at step 790, the value for X is decremented. The value may be decremented in a predetermined manner such as a manner similar to that described above. In some embodiments, the value for X may not be decremented below the initial value of X provided at step 710. After decrementing the value X at step 770, process 700 returns to step 720 as described above. If, at step 780, the determination is made that A is not less than Amin, at step 780, the value for X is unchanged and process 700 returns to step 720. The determination for S, at step 750, and the determinations for A, at steps 760 and 770, as well as the incrementing, at step 770, and decrementing, at step 790 may be performed as comparison and mathematics operations in a processor in the diagnostic device (e.g., processor 240 in diagnostic device 200).

Figure 8:
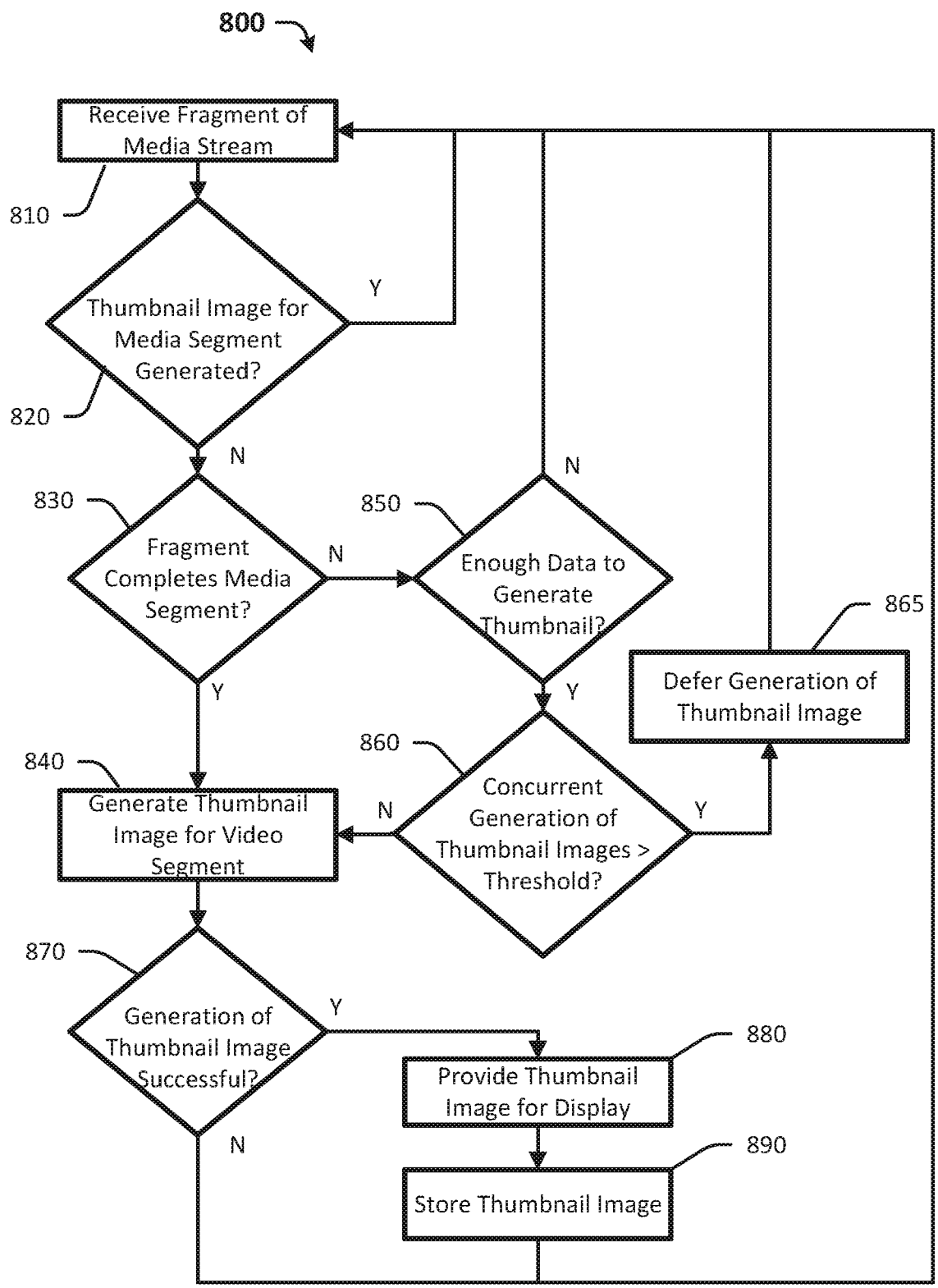
FIG. 8 is a flow chart of another exemplary process for depicting video content from media streams in a signal communication system, according to aspects of the present disclosure.

FIG. 8 illustrates a flow chart of another exemplary process 800 for depicting video content from media streams in a signal communication system according to aspects of the present disclosure. Process 800 will be primarily described with respect to diagnostic device 200 described in FIG. 2. One or more aspects of process 800 may equally apply to broadcast content diagnostic device 190 included in broadcast content distribution system 100 described in FIG. 1. Additionally, one or more steps of process 800 may be included in a software structure used as part of a diagnostic device, such as software structure 300 described in FIG. 3. Further, one or more steps of process 800 may be performed in conjunction with a GUI, such as the GUI described in FIG. 4 and FIG. 5. Although process 800 depicts steps performed in a particular order for purposes of illustration and discussion, the operations discussed herein are not limited to any particular order or arrangement.

At step 810, a fragment of a media stream is received. The media stream may be one of a set of media streams that are concurrently received. The set of media streams may be received through a network interface (e.g., signal interface 210, receiver 220, or local network interface 230) as part of being monitored through a diagnostic device (e.g., diagnostic device 200.

At step 820, a determination is made as to whether the thumbnail image for the media (e.g., video) segment associated with the fragment received, at step 810, has already been generated. The determination, at step 820, may be performed by a signal processor (e.g., processor 240). The information regarding the generation of the thumbnail image for the media segment may be retrieved from a memory, such as memory 250 or thumbnail table 340 in FIG. 3. The information is created and available when a thumbnail image has been generated before all of the fragments for the media segment have been received.

If it is determined, at step 820, that a thumbnail image has already been generated for the media segment associated with the fragment received, at step 810, process 800 returns to step 810 to receive another fragment of one of the media streams in the set of media streams. If it is determined, at step 820, that a thumbnail has not been generated for the media segment associated with the fragment, at step 830, a determination is made as to whether the fragment received, at step 810, completes the media segment. The determination, at step 830, may be performed by the signal processor (e.g., processor 240). The determination, at step 830, may be carried out in a manner similar to the determination at step 620 in FIG. 6.

If, at step 830, the fragment received at step 810 completes the media segment, then, at step 840, the generation of a thumbnail image representing the media segment associated with the fragment received, at step 810, is initiated. The generation of the thumbnail image, at step 840, may be performed by the signal processor (e.g., processor 240). In some embodiments, the generation may be performed as one thread in a multi-thread processor, such as thumbnail generation threads element 330 in FIG. 3. The generation, at step 840, may be carried out in a manner similar to the generation, at step 630, in FIG. 6.

If, at step, 830, the fragment received at step 810 does not complete the media segment, then, at step 850, a determination is made as to whether enough data has been received, with the inclusion of the fragment received, at step 810, to generate a thumbnail image. The determination, at step 850, may be performed by the signal processor (e.g., processor 240). The determination, at step 850, may be carried out in a manner similar to the determination, at step 660 in FIG. 6.

If, at step 850, the determination is made that enough data has not been received, process 800 returns to step 810 to receive another fragment for the media stream associated with the previously received fragment. If, at step 850, the determination is made that enough data has not been received, then at step 860, a determination is made as to whether the generation for the media segment, received at step 810, causes the number of thumbnail images that can be concurrently generated for the set of media streams received, at step 810, to exceeds a threshold value. The determination, at step 860, may be performed by the signal processor (e.g., processor 240). More specifically, the determination may be performed using information generated in a multi-thread processor, such as thumbnail generation threads element 330 described in FIG. 3. In some embodiments, the threshold value is related to the number of threads available for thumbnail image generation in the multi-thread processor (e.g., thumbnail generation threads element 330.

If at step 860, the determination is made that the number of concurrently generated thumbnail images exceeds the threshold value, then, at step 865, the generation of the thumbnail image for the media segment associated with the fragment received, at step 810, is deferred. The deferral, at step 865, may be implemented and managed in a manner similar to that described above for step 680 in FIG. 6. In some embodiments, the deferral, at step 865, may remain in place until the number of thumbnail images that are concurrently being generated for the set of media streams received, at step 810, falls below the threshold value.

If, at step 860, the determination is made that the number of concurrent generation of thumbnail images does not exceed the threshold value, then, the generation of a thumbnail image is initiated, at step 840, as described above. At step 870, a determination is made as to whether the generation of the thumbnail image, at step 840, that represents the media segment associated with the fragment, at step 810, was successful. The determination, at step 870, may be performed by the signal processor (e.g., processor 240). More specifically, the determination, at step 870, may involve information generated in a multi-thread processor, such as thumbnail generation threads element 330, and stored in a local table, such as thumbnail table 340 described in FIG. 3.

If it is determined, at step 870, that the generation of the thumbnail image, at step 840, was not successful, process 800 returns to step 810 to receive another fragment of one of the media streams in the set of media streams. If it is determined, at step 870, that the generation of the thumbnail image, at step 840, was successful, then, at step 880, the thumbnail image generated that represents the media segment being received at step 810, is provided for display in a manner similar to that described in FIG. 6. At step 890, the generated thumbnail image is stored in a memory (e.g., memory 250) also in a manner similar to that described above. After storing the generated thumbnail image, at step 890, process 800 returns to step 810 to receive another fragment of one of the media streams in the set of media streams.

It is worth noting that, in some instances, a thumbnail image may not be able to be generated for one or more media segments. In some embodiments, the outcome of the determination, at step 870, as to whether the generation of the thumbnail image was successful or not, may be stored in a memory, such as memory 250 or thumbnail table 340 in FIG. 3. The information may be used as part of determining whether the thumbnail image for a media segment associated with a fragment received, at step 810, has already been generated. For example, step 820 may be modified to determine whether the generation of the thumbnail image has been attempted, regardless of whether it was successfully generated or not.

It is to be appreciated that although the embodiments described above focus on physical hardware and elements within a signal communication system, the principles of the present disclosure may be easily extended to implementations that involve software-based programming that are stored in a computer readable medium, such as a magnetic optical based storage structure. Further, in some embodiments, one or more of the elements of a process based on the principles of the present disclosure, such as process 600 and/or process 700, as described, may be implemented utilizing cloud-based operations and/or storage. It is to be appreciated that, except where explicitly indicated in the description above, the various features included as part of the principles of the present disclosure can be considered cumulative and interchangeable, that is, a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described preferred embodiments for an apparatus and method for depicting a monitored stream of data packets, it is noted that modifications and variations can be made by persons skilled in the art in light of the above teachings. It is therefore to be understood that changes may be made in the particular embodiments of the disclosure which are within the scope of the disclosure as outlined by the appended claims.

The invention claimed is:

1. A method for generating a thumbnail image, comprising:
    receiving a first media stream, the first media stream including a video segment;
    determining, while receiving the first media stream, when a portion of the video segment that is capable of generating a thumbnail image has been received;
    generating a thumbnail image for the video segment using the portion of the video segment based on the determination; and
    providing the generated thumbnail image for display;
    receiving a second media stream concurrently with the first media stream, the second media stream including a video segment;
    determining, while receiving the second media stream, when a portion of the video segment included in the second media stream that is capable of generating a thumbnail image has been received;

generating a thumbnail image for the video segment included in the second media stream using the portion of the video segment included in the second media stream based on the determination, the thumbnail image for the video segment included in the second media stream being generated concurrently with the generation of the thumbnail image for the video segment included in the first media stream;

providing the generated thumbnail image for the video segment included in the second media stream for display;

determining if the generated thumbnail image for the video segment included in the second media stream equals a maximum number of concurrently generated thumbnails; and preventing further generation of thumbnail images for additional concurrently received media streams if it is determined that the ene rated thumbnail image for the video.

2. The method of claim 1, wherein the portion of the video segment contains at least one key frame and wherein generating the thumbnail image includes identifying the at least one key frame in the video segment.

3. The method of claim 2, wherein the key frame is an I-frame.

4. The method of claim 1, wherein the media stream is part of a broadcast signal.

5. The method of claim 4, wherein the broadcast signal is compliant with the advanced television systems committee (ATSC) standard 3.0.

6. The method of claim 1, wherein the video segment is encoded using a video compression algorithm.

7. The method of claim 6, wherein the video compression algorithm is compliant with the motion picture entertainment group (MPEG) standard MPEG-4 part 10.

8. The method of claim 1, wherein the threshold percentage value is provided by a user.

9. The method of claim 1, further comprising processing the video segment for analysis of at least one operational characteristic of the media stream, wherein the generating of the thumbnail image is asynchronous to the processing of the video segment.

10. The method of claim 1, wherein the second media stream includes the same video segment as the video segment included in the first media stream, the second media stream being provided from a content source that is different from content source for the first media stream.

11. A method for generating a thumbnail, comprising:
receiving a set of media streams simultaneously, each one of the set of media streams including at least one video segment;

for each of the at least one video segment in each one of the set of media streams, determining when a percentage of the video segment of the first media stream that exceeds a threshold percentage value has been received, the threshold percentage value determined by:
  retrieving, from a memory, data associated with the generation of thumbnail images for the at least one video segment included in each one of the set of media streams over a predetermined period of time;
  determining a value for a ratio of video segments for which a thumbnail image was successfully generated before a video segment used to generate the thumbnail image was completely received to the for the at least one video segment included in each one of the set of media streams for the predetermined period of time;
  determining a value for a ratio of video segments completely received that have a thumbnail image available to the for the at least one video segment included in each one of the set of media streams for the predetermined period of time; and
  modifying the threshold percentage value based on the value determined for the ratio of video segments for which a thumbnail image was successfully generated and the value determined for the ratio of video segments completely received;

generating a thumbnail image for the at least one video segment in each one of the media streams when it is determined that the percentage of the at least video segment in each one of the media streams that exceeds the threshold percentage value has been received; and providing the generated thumbnail image for display.

12. The method of claim 11, wherein the modifying the threshold percentage value further includes:
receiving, from a user, a thumbnail generation threshold value, the thumbnail generation threshold value representing a minimum ratio of video segments for which a thumbnail image was successfully generated before a video segment used to generate the thumbnail image was completely received to the for the at least one video segment included in each one of the set of media streams for the predetermined period of time;

receiving, from a user, a completed segment threshold value, the completed segment threshold value representing a minimum ratio of video segments completely received that have a thumbnail image available to the for the at least one video segment included in each one of the set of media streams for the predetermined period of time;

incrementing the threshold percentage value if the value determined for the ratio of video segments for which a thumbnail image was successfully generated is less than the thumbnail generation threshold value and the value determined for the ratio of video segments completely received is greater than or equal to the completed segment threshold value; and decrementing the threshold percentage value if the value determined for the ratio of video segments for which a thumbnail image was successfully generated is greater than or equal to the thumbnail generation threshold value and the value determined for the ratio of video segments completely received is less than the completed segment threshold value.

13. A method for generating a thumbnail image, comprising:
receiving a first media stream, the first media stream including a video segment;
determining, while receiving the first media stream, when a percentage of the video segment that has been received exceeds a threshold percentage value of the video segment that is adapted based on a heuristic algorithm, the heuristic algorithm comprising:
  retrieving, from a memory, data associated with the generation of thumbnail images for a set of video segments included in the first media stream over a predetermined period of time;
  determining a value for a ratio of video segments for which a thumbnail image was successfully generated before a video segment used to generate the thumbnail image was completely received to the set of video segments for the predetermined period of time;

determining a value for a ratio of video segments completely received that have a thumbnail image available to the set of video segments for the predetermined period of time; and modifying the threshold percentage value based on the value determined for the ratio of video segments for which a thumbnail image was successfully generated and the value determined for the ratio of video segments completely received;

generating a thumbnail image for the video segment using the portion of the video segment based on the determination; and providing the generated thumbnail image for display.

* * * * *